(12) United States Patent
Roh

(10) Patent No.: US 9,600,153 B2
(45) Date of Patent: Mar. 21, 2017

(54) MOBILE TERMINAL FOR DISPLAYING A WEBPAGE AND METHOD OF CONTROLLING THE SAME

(75) Inventor: Hyeongseok Roh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 1055 days.

(21) Appl. No.: 13/072,475

(22) Filed: Mar. 25, 2011

(65) Prior Publication Data

US 2012/0005569 A1 Jan. 5, 2012

(30) Foreign Application Priority Data

Jul. 5, 2010 (KR) .................. 10-2010-0064263
Jul. 19, 2010 (KR) .................. 10-2010-0069418

(51) Int. Cl.
| | |
|---|---|
| *G06F 3/00* | (2006.01) |
| *G06F 3/0484* | (2013.01) |
| *G06F 1/16* | (2006.01) |
| *H04M 1/725* | (2006.01) |

(52) U.S. Cl.
CPC ........ *G06F 3/04842* (2013.01); *G06F 1/1626* (2013.01); *G06F 3/0484* (2013.01); *H04M 1/72561* (2013.01); *G06F 2203/04806* (2013.01); *H04M 2250/12* (2013.01); *H04M 2250/22* (2013.01)

(58) Field of Classification Search
CPC .. G06F 17/2247; G06F 17/212; G06F 17/211; G06F 17/24; G06F 17/0484; G06F 17/30905; G06F 3/00; G06F 13/00; G06F 3/04842; G06F 3/0484; G06F 1/1626; G06F 1/72561; G06F 2203/04806; H04N 5/445; H04M 1/72561; H04M 2250/12; H04M 2250/22
USPC ........ 715/207, 217, 220, 234, 273, 504, 864
See application file for complete search history.

(56) References Cited

U.S. PATENT DOCUMENTS

| | | | | |
|---|---|---|---|---|
| 5,640,580 A | * | 6/1997 | Slayden ................ | G06F 3/0489 715/209 |
| 6,044,385 A | * | 3/2000 | Gross ................ | G06F 17/30716 345/427 |
| 6,133,916 A | * | 10/2000 | Bukszar ................ | G06F 17/211 715/744 |
| 7,705,861 B2 | * | 4/2010 | Mielke ............. | G06F 17/30905 345/642 |
| 7,889,212 B2 | * | 2/2011 | Schulz ................. | G06F 3/0481 345/428 |
| 8,448,082 B2 | * | 5/2013 | Yoon et al. .................... | 715/780 |
| 8,812,978 B2 | * | 8/2014 | Eschbach ............. | G06F 17/211 715/801 |

(Continued)

FOREIGN PATENT DOCUMENTS

| | | |
|---|---|---|
| KR | 10-2009-0036744 A | 4/2009 |
| KR | 10-2009-0070491 A | 7/2009 |

*Primary Examiner* — Scott Baderman
*Assistant Examiner* — Hassan Mrabi
(74) *Attorney, Agent, or Firm* — Birch, Stewart, Kolasch & Birch, LLP

(57) ABSTRACT

A mobile terminal and a method for controlling the same are disclosed. According to one embodiment, the mobile terminal and method for controlling the same are capable of adjusting the magnification of a web page being displayed on a web browser to an optimal level or assigning an access key to a link so as to provide a more convenient web browsing environment.

2 Claims, 23 Drawing Sheets

(56) References Cited

U.S. PATENT DOCUMENTS

| | | | |
|---|---|---|---|
| 2001/0044868 A1* | 11/2001 | Roztocil | G06F 17/212 358/1.1 |
| 2006/0036955 A1* | 2/2006 | Baudisch | G06F 3/0481 715/747 |
| 2006/0282444 A1* | 12/2006 | Chen et al. | 707/100 |
| 2007/0162875 A1* | 7/2007 | Paquette et al. | 715/847 |
| 2009/0044124 A1* | 2/2009 | Pihlaja | G06F 3/0488 715/733 |
| 2009/0089707 A1* | 4/2009 | Knowles | G06F 3/0481 715/800 |
| 2009/0144642 A1* | 6/2009 | Crystal | G06F 3/04817 715/764 |
| 2010/0235786 A1* | 9/2010 | Maizels | G06F 3/011 715/810 |
| 2010/0235793 A1* | 9/2010 | Ording et al. | 715/863 |
| 2011/0074698 A1* | 3/2011 | Rapp | G06F 3/0481 345/173 |
| 2011/0074828 A1* | 3/2011 | Capela | G06F 3/0481 345/661 |
| 2011/0078597 A1* | 3/2011 | Rapp | G06F 3/04845 715/765 |
| 2011/0163968 A1* | 7/2011 | Hogan | G06F 3/04883 345/173 |

* cited by examiner (a)

(b)

(a)

(b)

(a)

(b)

(a)

(b)

(c)

(a)

(b)

(c)

(a)

(b)

(a)

(b)

(c)

(d)

(a)

(b)               (c)

(a)

(b)

(a)

(b)

(a)

(b)

(c)

(d)

(a)    (b)

(c)

MOBILE TERMINAL FOR DISPLAYING A WEBPAGE AND METHOD OF CONTROLLING THE SAME

CROSS REFERENCE TO RELATED APPLICATIONS

This application claims the benefit of the Korean Patent Application Nos. 10-2010-0069418, filed on Jul. 19, 2010 and 10-2010-0064263, filed on Jul. 5, 2010, which are hereby incorporated by reference as if fully set forth herein.

BACKGROUND OF THE INVENTION

Field of the Invention

The present invention relates to a mobile terminal and, more particularly, to a mobile terminal and a method for controlling the same that is capable of adjusting magnification of a web page being displayed on a web browser to an optimal level or assigning an access key to a link so as to provide a more convenient web browsing environment.

Discussion of the Related Art

A terminal (or user equipment) may be categorized as a mobile/portable terminal and a stationary terminal depending upon the mobility of the terminal. The terminal may then be categorized as a handheld terminal and a vehicle mount terminal depending upon whether or not the terminal can be carried (i.e., portable) by the user.

As described above, as the functions of the terminal are becoming more diversified, the terminal is being embodied in the form of a multimedia player performing multiple functions, such as taking pictures or recording (or filming) moving pictures, playing-back music files or moving picture files, playing games, receiving broadcast programs, and so on.

In order to support and enhance such diverse functions of the terminal, the issue of improving and enhancing the structural aspects and/or the software of the terminal may be taken into consideration.

With the recent improvement in wireless data communication functions and data processing capability of mobile terminals, the use of the Internet through mobile terminals is increasing. However, since web pages are generally designed to fit the display environment of desktop computers, a method for providing web pages with adequate enlargement/reduction ratios best-fitting the user's convenience is being required in mobile terminals. This is because the display devices used in mobile terminals have a relatively small size as compared to the desktop computers. Additionally, since a web page being displayed on a web browser generally includes one or more links, a method for more conveniently selecting the links is also required.

SUMMARY OF THE INVENTION

Accordingly, the present invention is directed to a mobile terminal and a method for controlling the same that substantially obviate one or more problems due to limitations and disadvantages of the related art.

Another object of the present invention is to provide a mobile terminal and a method for controlling the same that can adequately adjust the magnification of a web page, which is being displayed on a web browser, to its optimal level, thereby providing the adequately magnified web page to the user.

Another object of the present invention is to provide a mobile terminal and a method for controlling the same that can not only adequately adjust the magnification of a web page, which is being displayed on a web browser, to its optimal level, but also adequately adjust a display location (or portion) of the web page, thereby providing an adequately magnified portion or an adequate portion of the web page to the user.

Another object of the present invention is to provide a mobile terminal and a method for controlling the same that can efficiently assign an access key to a link, which is indicated (or displayed) on a web browser.

A further object of the present invention is to provide a mobile terminal and a method for controlling the same that can perform additional functions through the selected access key.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal includes a display unit, a wireless communication unit configured to transmit and receive data to and from an external device via wireless communication, and a controller configured to acquire a document including configuration information on a specific web page through the wireless communication unit, and to display a second area by using the configuration information, the second area having at least one of a magnification and a display position of a first area of the web page adjusted therein so that a predetermined optimal display condition can be satisfied.

In another aspect of the present invention, a method for controlling a mobile terminal includes the steps of acquiring a document including configuration information on a specific web page through a wireless communication unit, deciding a second area by using the configuration information, the second area having at least one of a magnification and display position of a first area of the web page adjusted therein so that a predetermined optimal display condition can be satisfied, and displaying the second area on a display unit. Herein, the optimal display condition may include at least one of number of links included in the first area, size of a link, number of images, size of an image, number of strings, font size of a string, inclusion of a specific string, and presence of a table.

In yet another aspect of the present invention, a mobile terminal includes a display unit, a wireless communication unit configured to transmit and receive data to and from an external device via wireless communication, and a controller configured to acquire a document including link information on a specific web page through the wireless communication unit, to determine at least one first link included in a first area of a web page by using the link information, the first area of the web page being displayed on the display unit, to assign a hot key to each of at least one second link among the at least one first link, based upon a predetermined standard, and to apply a visual effect for identifying each of the assigned hot keys to each of the at least one second link. Herein, the hot keys may respectively correspond to a plurality of key buttons provided in the user input unit.

In a further aspect of the present invention, a method for controlling a mobile terminal includes the steps of downloading a document including link information on a specific web page through the wireless communication unit, determining at least one first link included in a first area of a web page by using the link information, the first area of the web page being displayed on the display unit, assigning a hot key to the at least one first link and to at least one second link based upon a predetermined standard, and applying a visual effect for identifying each of the assigned hot keys to each of the at least one second link.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of terminals. Examples of such terminals include mobile as well as stationary terminals, such as mobile phones, user equipment, smart phones, DTV, computers, digital broadcast terminals, personal digital assistants, portable multimedia players (PMP) and navigators.

However, by way of non-limiting example only, further description will be with regard to a mobile terminal 100, and it should be noted that such teachings may apply equally to other types of terminals.

Figure 1:
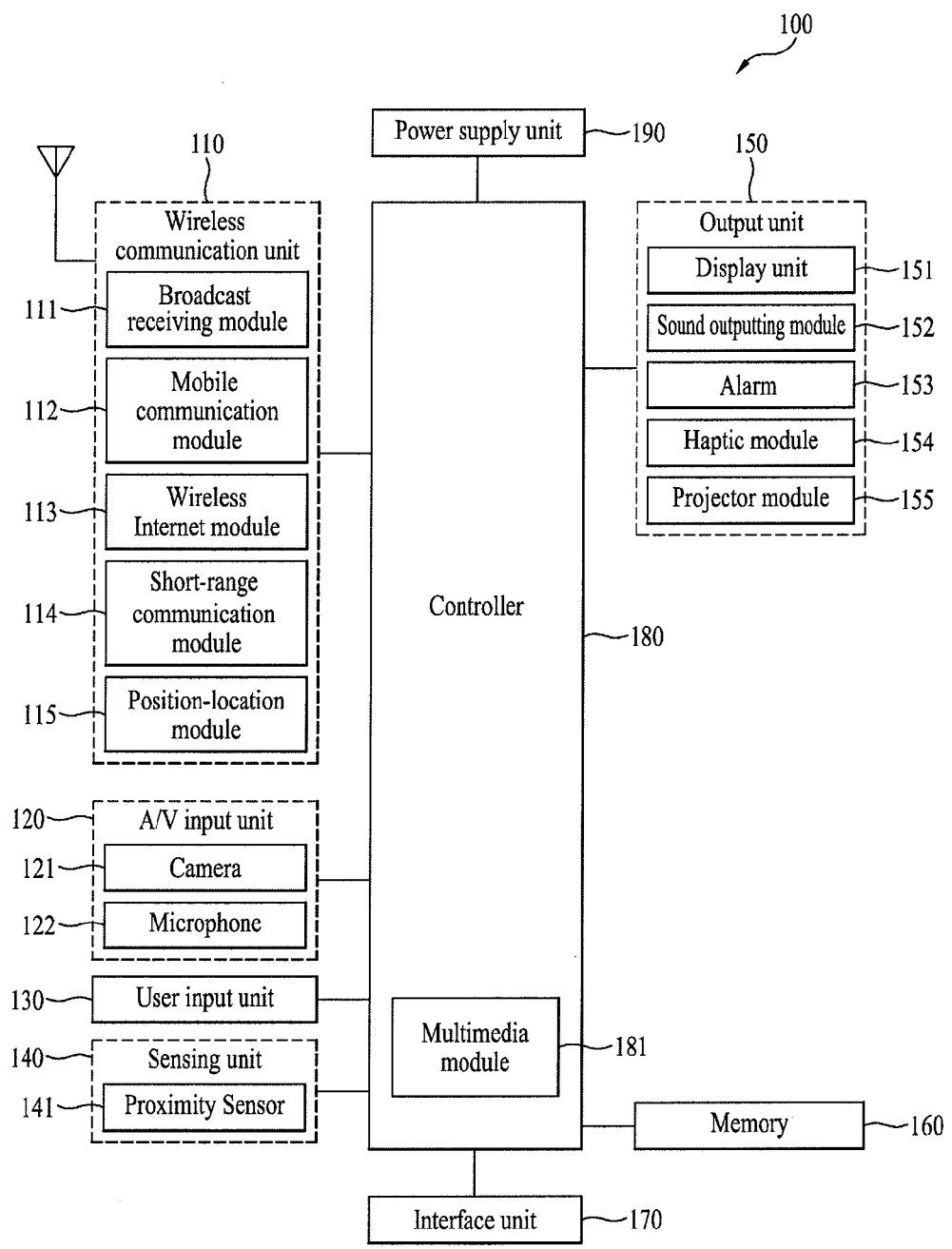
FIG. 1 illustrates a block diagram of a mobile terminal according to an embodiment of the present invention.

FIG. 1 is a block diagram of a mobile terminal 100 in accordance with an embodiment of the present invention. FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By non-limiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message exchanges, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100.

As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display 151, an audio output module 152, an alarm unit 153, a haptic module 154, a projector module 155 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmissive type, which can be named a transparent display. As a representative example for the transparent display, there is TOLED (transparent OLED) or the like. A rear configuration of the display 151 can be implemented in the optical transmissive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and a sensor for detecting a touch action (hereinafter called 'touch sensor') configures a mutual layer structure (hereinafter called 'touchscreen'), it is able to use the display 151 as an input device as well as an output device. In this case, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Referring to FIG. 1, a proximity sensor (not shown in the drawing) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmissive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

In the following description, for clarity, an action that a pointer approaches without contacting with the touchscreen to be recognized as located on the touchscreen is named 'proximity touch'. And, an action that a pointer actually touches the touchscreen is named 'contact touch'. The meaning of the position on the touchscreen proximity-touched by the pointer means the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, and a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display 151, on an external screen or wall according to a control signal of the controller 180.

In particular, the projector module 155 can include a light source (not shown in the drawing) generating light (e.g., laser) for projecting an image externally, an image producing means (not shown in the drawing) for producing an image to output externally using the light generated from the light source, and a lens (not shown in the drawing) for enlarging to output the image externally in a predetermined focus distance. And, the projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. And, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectable to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2:
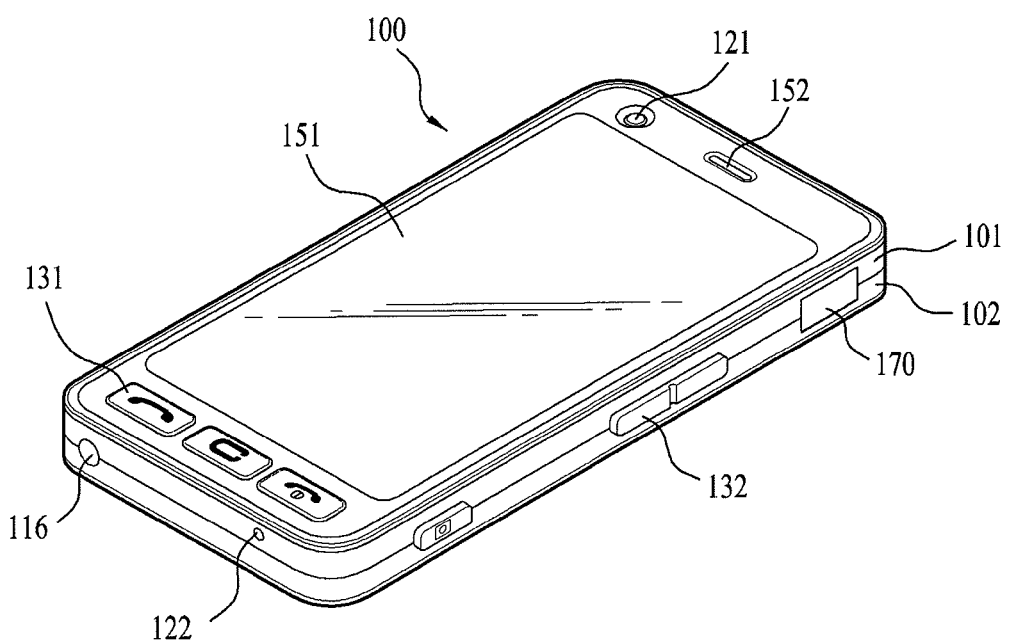
FIG. 2 illustrates a front perspective view of a mobile terminal according to an embodiment of the present invention.

FIG. 2 is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof.

For clarity, further disclosure will primarily relate to a bar-type mobile terminal 100. However such teachings apply equally to other types of mobile terminals.

Referring to FIG. 2, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display 151, an audio output unit 152, a camera 121, user input units 130/131 and 132, a microphone 122, an interface 180 and the like can be provided to the terminal body, and more particularly, to the front case 101.

The display 151 occupies most of a main face of the front case 101. The audio output unit 151 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152, a command for a switching to a touch recognizing mode of the display 151 or the like can be inputted to the second manipulating unit 132.

Interconnected operational mechanism between the display 151 and the touchpad 135 are explained with reference to FIG. 3 as follows.

Figure 3:
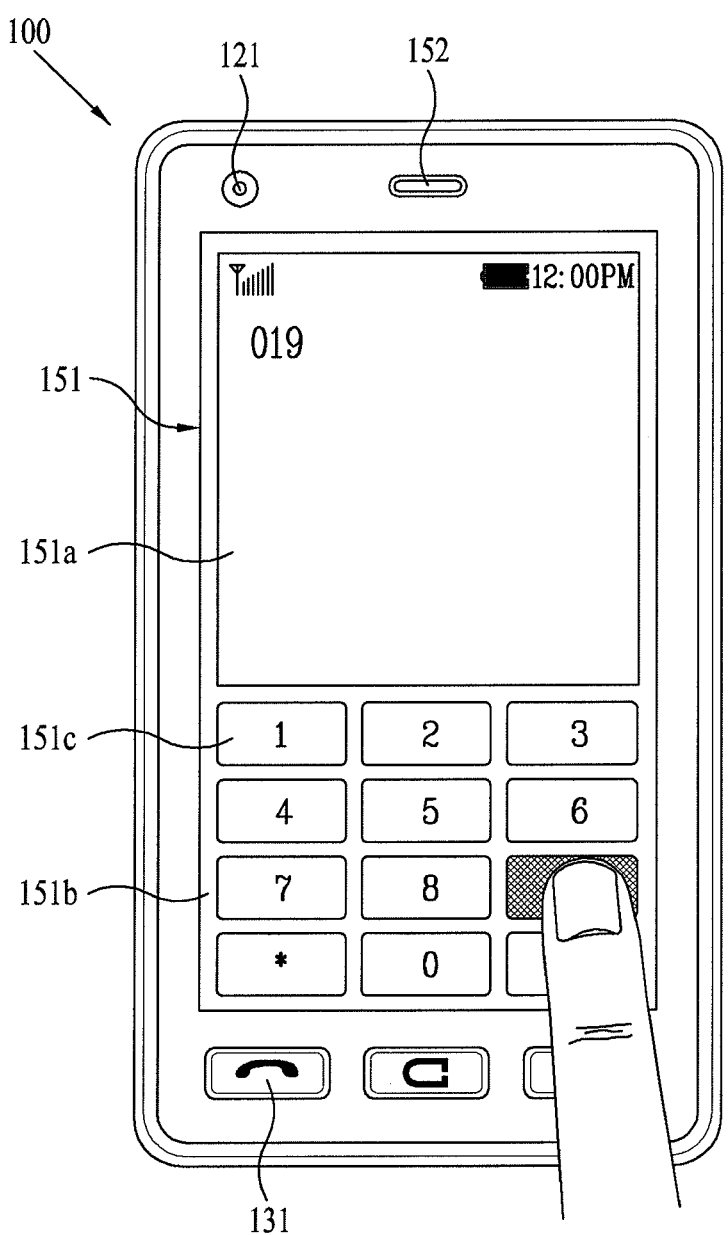
FIG. 3 illustrates a front view of a mobile terminal for describing an operation of the mobile terminal according to the present invention.

FIG. 3 is a front-view diagram of a terminal according to one embodiment of the present invention for explaining an operational state thereof.

First of all, various kinds of visual information can be displayed on the display 151. And, theses information can be displayed in characters, numerals, symbols, graphics, icons and the like.

In order to input the information, at least one of the characters, numerals, symbols, graphics and icons are represented as a single predetermined array to be implemented in a keypad formation. And, this keypad formation can be so-called 'soft keys'.

FIG. 3 shows that a touch applied to a soft key is inputted through a front face of a terminal body.

The display 151 is operable through an entire area or by being divided into a plurality of regions. In the latter case, a plurality of the regions can be configured interoperable.

For instance, an output window 151a and an input window 151b are displayed on the display 151. A soft key 151c' representing a digit for inputting a phone number or the like is outputted to the input window 151b. If the soft key 151c' is touched, a digit corresponding to the touched soft key is outputted to the output window 151a. If the first manipulating unit 131 is manipulated, a call connection for the phone number displayed on the output window 151a is attempted.

Besides, the display 151 or the touchpad 135 can be configured to receive a touch input by scroll. A user scrolls the display 151 or the touchpad 135 to shift a cursor or pointer located at an entity (e.g., icon or the like) displayed on the display 151. Furthermore, in case that a finger is shifted on the display 151 or the touchpad 135, a path of the shifted finger can be visually displayed on the display 151. This may be useful in editing an image displayed on the display 151.

To cope with a case that both of the display (touch screen) 151 and the touchpad 135 are touched together within a predetermined time range, one function of the terminal can be executed. The above case of the simultaneous touch may correspond to a case that the terminal body is held by a user using a thumb and a first finger (clamping). The above function can include activation or deactivation for the display 151 or the touchpad 135.

For clarity and convenience of the following description, a mobile terminal mentioned in the following description is assumed as including at least one of the components shown in FIG. 1. Meanwhile, such a graphic for pointing at a specific object on a display unit or selecting a menu from the display unit as an arrow, a finger and the like is called a pointer or a cursor. Yet, the pointer is frequently used to mean a finger, a stylus pen or the like for a touch manipulation and the like. In order to clearly discriminate the pointer and the cursor from each other in this disclosure, a graphic displayed on a display unit is named a cursor and such a physical means for performing a touch, a proximity touch, a gesture and the like as a finger, a stylus pen and the like is named a pointer.

First Embodiment

Recently, with an outstanding improvement in the performance of a processor of the mobile terminal, i.e., a controller 180 of the mobile terminal, the processor (i.e., controller 180) has become capable of performing highly advanced operations (or calculations). Also, with the enhancement in the performance of a wireless communication unit 110 high speed data communication has become available through diverse wireless interfaces.

Accordingly, the quality of web surfing (i.e., web browsing) in a desktop computer environment has become equally available in mobile terminals. However, since web pages are generally designed to best-fit the environment of desktop computers, the act of performing web browsing by using a mobile terminal, which is provided with a relatively smaller display unit 151 as compared to that of desktop computers, requires frequent and constant operations of scrolling areas of the corresponding web page being displayed on the display unit 151 of the mobile terminal and also requires frequent and constant operations of increasing (or enlarging) and/or reducing the magnification of the displayed areas of the corresponding web page.

More specifically, if the magnification is too high, the information/link being displayed on a single screen may be insufficient. On the other hand, if the magnification is too low, an excessive amount of information/links may be displayed, or the information/links may be displayed in small fonts, thereby causing low visibility and difficulty in selecting a wanted link. This will hereinafter be described in more detail with reference to FIG. 4.

Figure 4:
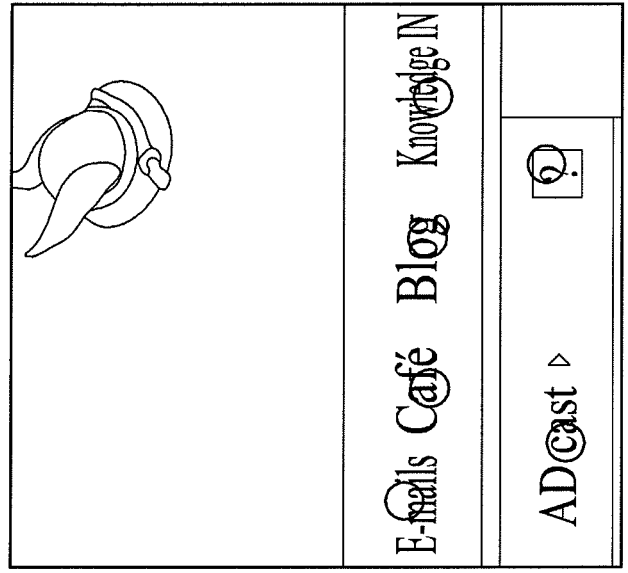
FIG. 4 illustrates an exemplary web page being displayed on a display unit of the mobile terminal according to the present invention.
Figure 4:
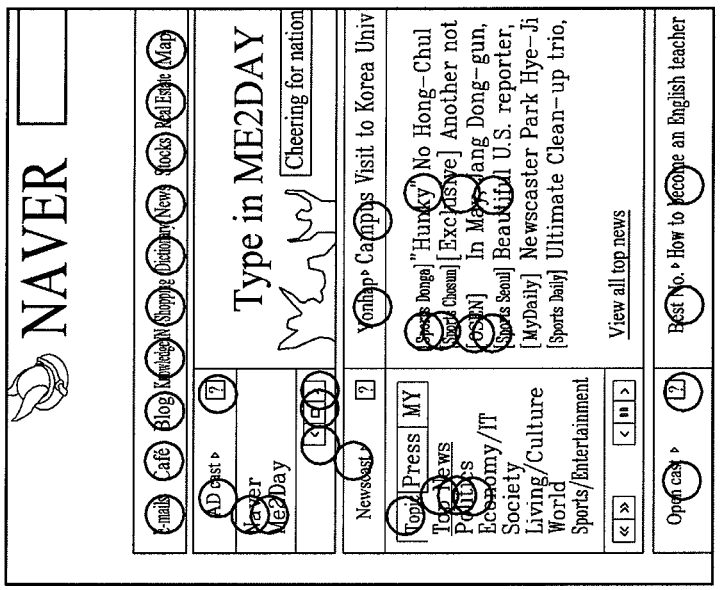

FIG. 4 illustrates an exemplary web page being displayed on a display unit of a mobile terminal according to the present invention.

In the accompanying drawings of the description of the present invention including FIG. 4, each small circle indicates a link (or an anchor). Herein, a link directs (or points) a display screen to a specific web page by using an address value of the corresponding web page. And, when the user selects a link, the selected link may shift (or move) the display screen to the web page designated by the selected link.

Referring first to (a) of FIG. 4, an excessive number of links are displayed in a single display screen. Accordingly, since the area occupied by each link is too small, it is difficult to perform an accurate selection of a wanted link and to read the letters (or texts) (i.e., readability is low). Therefore, the corresponding web page is required to be magnified (i.e., enlarged). In the situation shown in (b) of FIG. 4, since the number of links is excessively small, the amount of information that is being displayed on the display screen is too small. Therefore, in this case, the magnification is required to be decreased (i.e., the display ratio of the web page is required to be reduced).

Therefore, the present invention proposes a method for optimizing the display magnification of a web page, which is being displayed in accordance with a predetermined standard, by using information included in the corresponding web page according to an embodiment of the present invention. Hereinafter, the proposed method will be described in detail with reference to FIG. 5.

Figure 5:
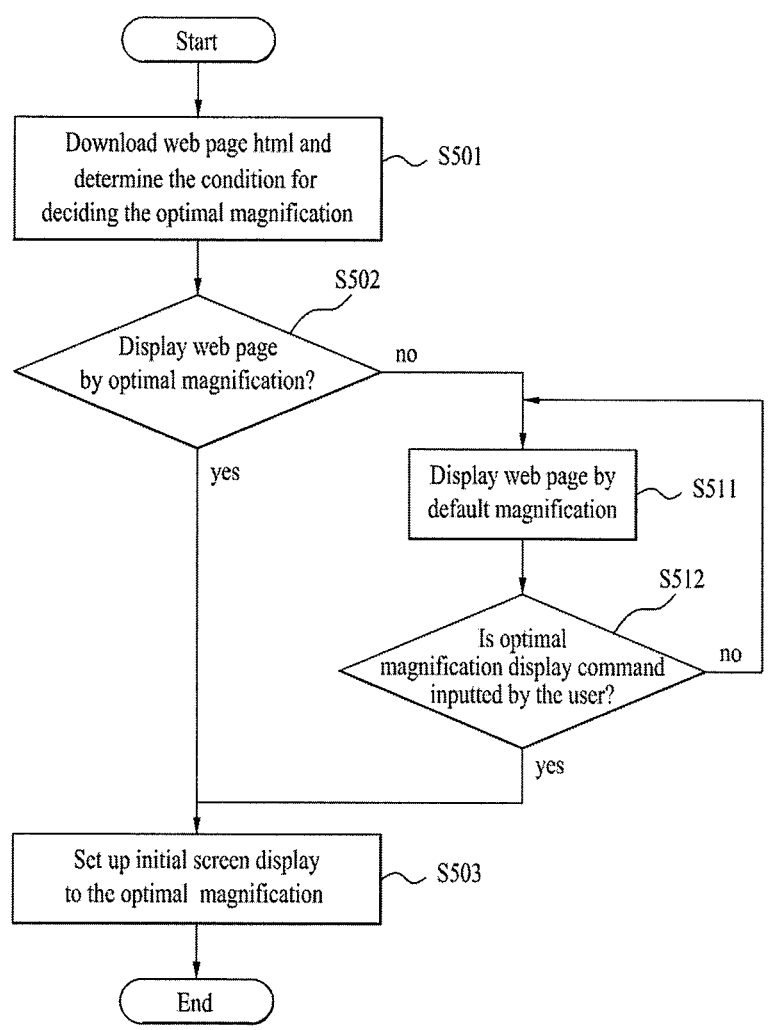
FIG. 5 illustrates an exemplary procedure for deciding an optimal magnification according to an embodiment of the present invention.

FIG. 5 illustrates an exemplary procedure for deciding an optimal magnification according to an embodiment of the present invention.

Referring to FIG. 5, when a web browser is being executed, the controller 180 first controls the mobile terminal so that the mobile terminal can download a document, which includes information on a web page set up by default, a web page selected by a link or selected from a "My Favorites" menu, or a web page corresponding to a web address inputted by the user in a Uniform Resource Locator (URL) window of the web browser, and may then use at least a portion of the information included in the downloaded document, so as to decide the optimal magnification (S501).

At this point, the document including the information of the web page is written in a predetermined web programming language. Herein, a web programming language is a collective concept including hypertext markup language (HTML), JAVA, XML, CSS, ASP, and so on. However, in the description of the present invention, it is assumed that HTML is used as the web programming language for simplicity. In other words, the corresponding document is assumed to be an HTML document.

The information that is used for deciding the magnification is as described below.

Number of links: the format of a link generally consists of a string (or a text or character sequence) that is underlined. However, a link according to the present invention will not be limited only to the above-mentioned format. More specifically, according to the present invention, the concept of a link shall include image links, flash links, and so on.

Number of strings: it is preferable that the number of strings is set up by font size.

Number of images: it is preferable that the number of images is also set up by image size.

Existence of a table: if a table dividing areas within a web page by using HTML tags exists, the number of tables, the size of each table, and so on may be taken into consideration.

The presence/absence of a predetermined web-page-specific magnification (i.e., a predetermined magnification designated to a specific web address) may be taken into consideration.

At this point, a procedure for analyzing an HTML document in order to acquire information required for deciding the optimal magnification may follow the process steps described below.

Convert the downloaded HTML document to a formatted document (i.e., convert the downloaded HTML document to a grammar-checked and corrected document or an XML document).

Recognize each tag included in the converted document.

Perform parsing in a tree structure based upon the recognized tags.

Read the tree information from top to bottom so as to understand and sort the information carried by each tag.

Analyze hyperlink tags, image link tags, and string output tags included in the document.

Once the procedure for acquiring information for deciding the optimal magnification by performing the above-described process steps is completed, the controller 180 uses the analyzed result and predetermined conditions for deciding the optimal magnification, so as to decide the optimal magnification for displaying an initial screen.

For example, when the condition for deciding the optimal magnification is set up as 'number of links displayed on the screen=10 links', the controller 180 decides an enlargement/reduction ratio (or magnification) that allows only 10 links to be included in the initial screen as the optimal magnification. More specifically, the process of deciding the optimal magnification may signify the process of deciding a scope of the area of a web page being displayed in a single screen. At this point, the standard point for adjusting the magnification may correspond to the center of the screen or an upper left portion of the screen. However, this may be varied according to the user settings.

Thereafter, the controller 180 displays the magnification-adjusted web page on the display unit 151, wherein the magnification of the corresponding web page is adjusted in accordance with the decided optimal display magnification (or display area) (S503).

However, if settings are made so that the above-described function for providing the optimal magnification cannot be applied to the initial screen (S502), the corresponding web page is displayed in a default magnification initially set-up by the web browser (S511). Subsequently, when the user inputs an optimal magnification display command (S512), the optimal magnification display function according to the present invention can be performed. In this case, the controller 180 controls the mobile terminal so that the optimal magnification display function can be executed in the web page area, which is displayed at the point the command is inputted, as a method for adjusting the display magnification to best-fit the conditions for deciding the optimal magnification.

At this point, the optimal magnification display command inputted by the user may be executed by manipulating a specific hardware key button provided in the main body of the mobile terminal, by manipulating a specific virtual key button displayed on a touch screen, or by having a sensor 140 perform a method of detecting specific shaking (or oscillation) patterns of the mobile terminal.

Hereinafter, a result of performing the method of displaying an optimal magnification according to the embodiment of the present invention will be described in detail with reference to FIG. 6 and FIG. 7.

Figure 6:
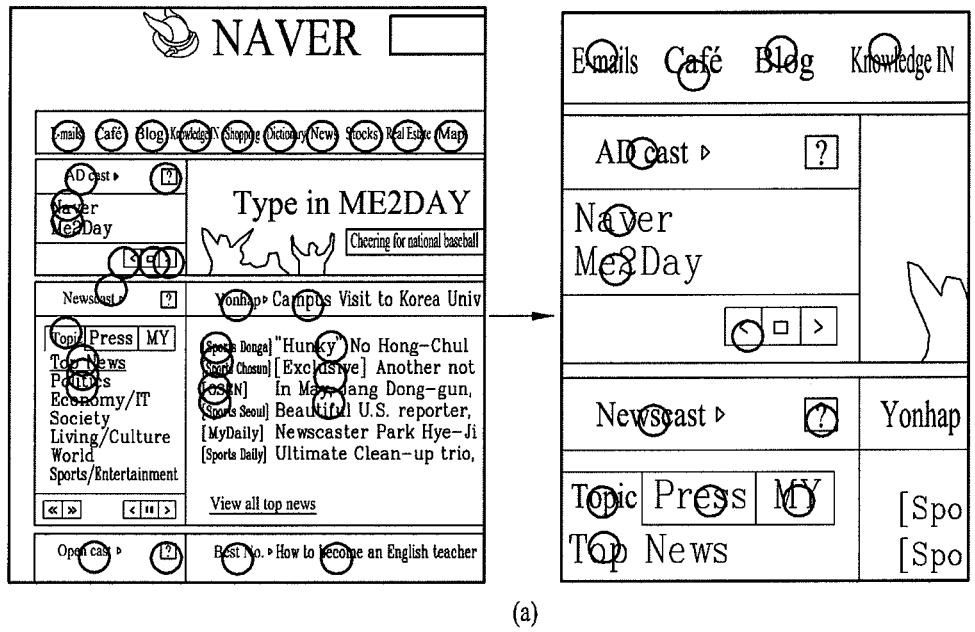
FIG. 6 illustrates an exemplary display format of a web page, wherein the magnification level of the web page is adjusted to satisfy the condition for deciding an optimal magnification according to an embodiment of the present invention.
Figure 6:
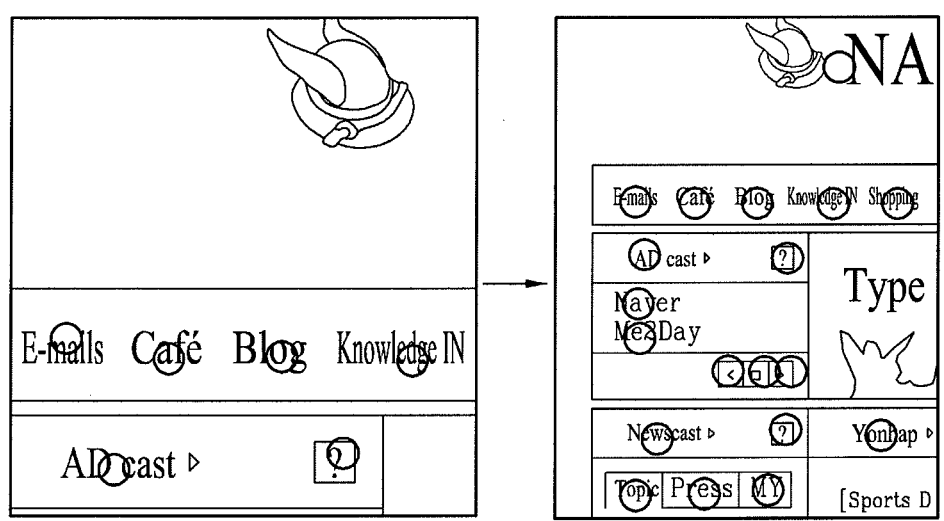

FIG. 6 illustrates an exemplary display format of a web page, wherein the magnification level of the web page is adjusted to satisfy the condition for deciding an optimal magnification according to an embodiment of the present invention.

In FIG. 6, it is assumed that the range (or scope) of the number of links is set up as the condition for deciding the optimal magnification.

First of all, the left side of (a) of FIG. 6 corresponds to a format of a random web page being displayed in accordance with default magnification settings of a web browser. Referring to FIG. 6, too many links are included in the web page shown on the left side of (a). In this case, if the optimal magnification adjustment procedure according to the present invention is performed, the display magnification may be increased so that the number of links being displayed on the display screen can come within the range satisfying the conditions for deciding the optimal magnification, as shown in the right side of (a).

Additionally, the left side of (b) of FIG. 6 corresponds to a format of another random web page being displayed in accordance with default magnification settings of a web browser. Herein, an excessively small number of links is included in the web page shown on the left side of (b). In this case, if the optimal magnification adjustment procedure according to the present invention is performed, the display magnification may be decreased so that the number of links being displayed on the display screen can come within the range satisfying the conditions for deciding the optimal magnification, as shown in the right side of (b).

Figure 7:
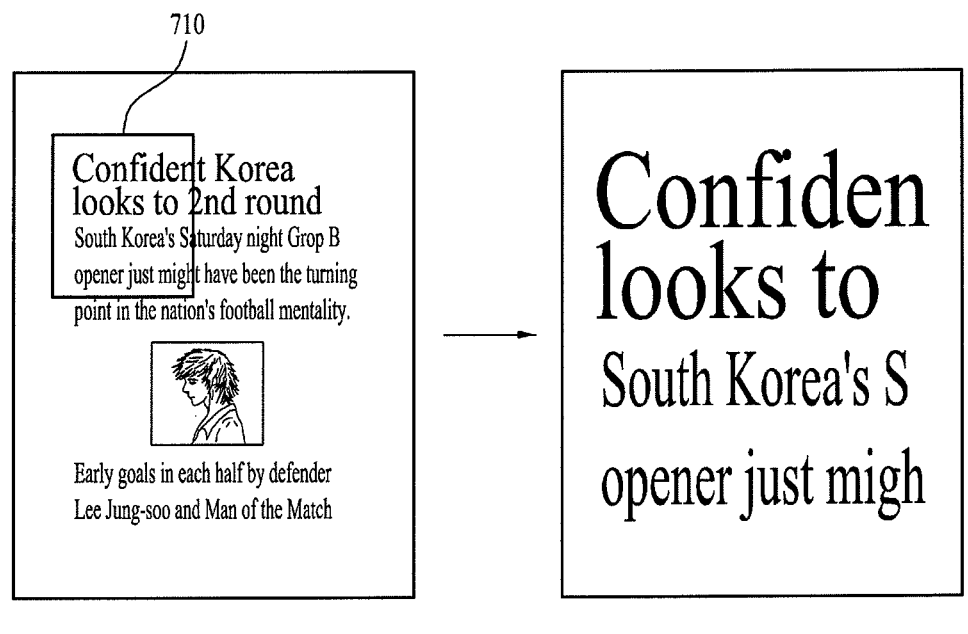
FIG. 7 illustrates another exemplary display format of a web page, wherein the magnification level of the web page is adjusted to satisfy the condition for deciding an optimal magnification according to an embodiment of the present invention.
Figure 7:
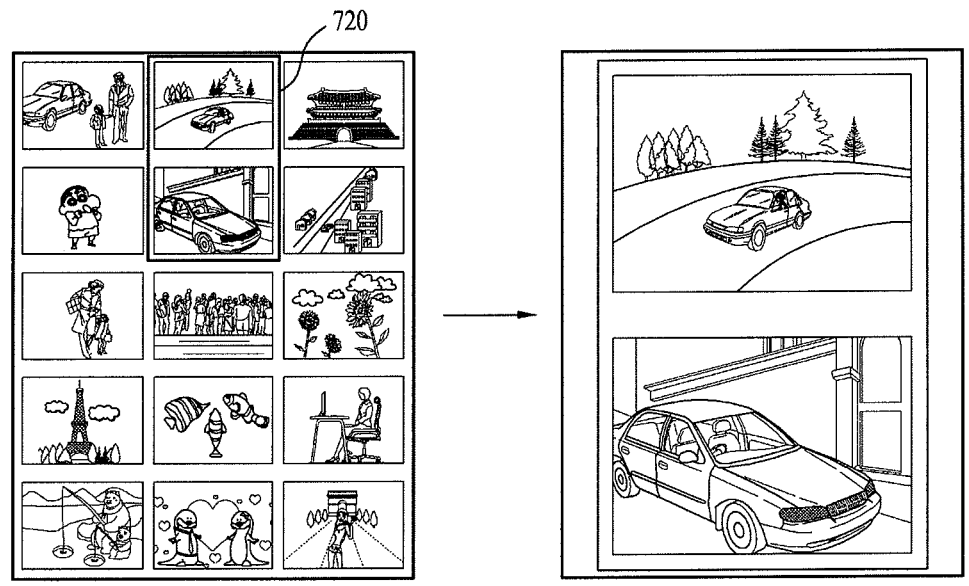

FIG. 7 illustrates another exemplary display format of a web page, wherein the magnification level of the web page is adjusted to satisfy the condition for deciding an optimal magnification according to an embodiment of the present invention.

In (a) of FIG. 7, it is assumed that the range (or scope) of the number of strings (character sequence) is set up as the condition for deciding the optimal magnification. First of all, the left side of (a) of FIG. 7 corresponds to a format of a random web page being displayed in accordance with default magnification settings of a web browser. Referring to (a) of FIG. 7, too many strings are included in the web page shown on the left side. In this case, if the optimal magnification adjustment procedure according to the present invention is performed, the display magnification may be increased so that the number of strings being displayed on the display screen can come within the range satisfying the conditions for deciding the optimal magnification (i.e., so that area 710 can be displayed), as shown in the right side of (a).

In (b) of FIG. 7, it is assumed that the range (or scope) of the number of images (e.g., 2 images) is set up as the condition for deciding the optimal magnification. First of all, the left side of (b) of FIG. 7 corresponds to a format of a random web page being displayed in accordance with default magnification settings of a web browser. Referring to (b) of FIG. 7, too many images are included in the web page shown on the left side. In this case, if the optimal magnification adjustment procedure according to the present invention is performed, the display magnification may be increased so that the number of images being displayed on the display screen can come within the range satisfying the conditions for deciding the optimal magnification, as shown in the right side of (b).

In the above-described embodiment of the present invention, only one element is considered as the condition for deciding the optimal magnification. However, this is merely exemplary. And, therefore, two or more elements may be taken into consideration simultaneously as the condition for deciding the optimal magnification. For example, the number of images and the number of links can be simultaneously considered as the condition for deciding the optimal magnification. In this case, when it is difficult to find the magnification best-fitting the two conditions at the same time, it is preferable to set up a condition that is to be considered with a higher priority level.

Another Aspect of the First Embodiment

According to another aspect of the first embodiment of the present invention, as the user inputs a command for scrolling the web page, even if the area being displayed on the display unit is changed, the optimal magnification for the changed area can be provided. This will be described in detail with reference to FIG. 8.

Figure 8:
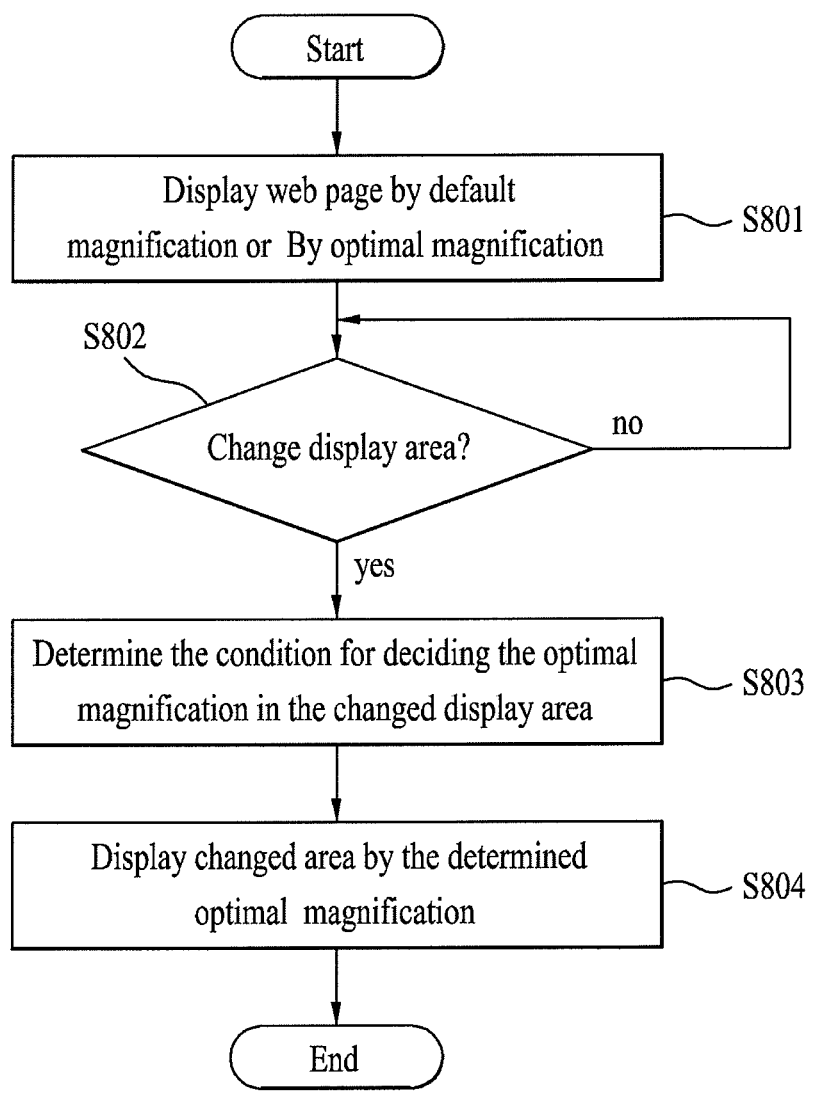
FIG. 8 illustrates an exemplary procedure for deciding an optimal magnification, when a display area of the web page is changed due to screen scrolling, according to another aspect of the embodiment of the present invention.

FIG. 8 illustrates an exemplary procedure for deciding an optimal magnification, when a display area of the web page is changed due to screen scrolling, according to another aspect of the embodiment of the present invention.

Referring to FIG. 8, a predetermined area of a web page may first be displayed either with a web page display magnification set up by default in a web browser or with the optimal magnification according to the embodiment of the present invention (S801).

At this point, it is assumed that the analysis of an HTML document of the respective web page, which is performed in order to acquire information for deciding the optimal magnification, according to the process shown in step S501 of FIG. 5 is performed in advance by the controller.

Thereafter, as the user inputs a command for changing (e.g., scrolling) the display area of the respective web page, if the area being displayed on the display unit is changed (S802), the controller 180 may determine the optimal display magnification of the changed area, so as to satisfy the predetermined condition for deciding the optimal display magnification (S803).

Subsequently, the magnification of the changed area is adjusted in accordance with the determined optimal display magnification, thereby being displayed on the display unit (S804).

An exemplary display format of an optimally magnified display area of a web page, wherein the display area of the web page is changed due to screen scrolling, according to another embodiment of the present invention will now be described with reference to FIG. 9.

Figure 9:
FIG. 9 illustrates an exemplary display format of an optimally magnified display area of a web page, wherein the display area of the web page is changed due to screen scrolling, according to another aspect of the embodiment of the present invention.
Figure 9:
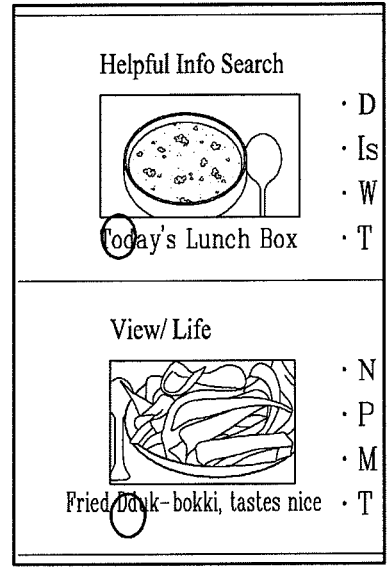
Figure 9:
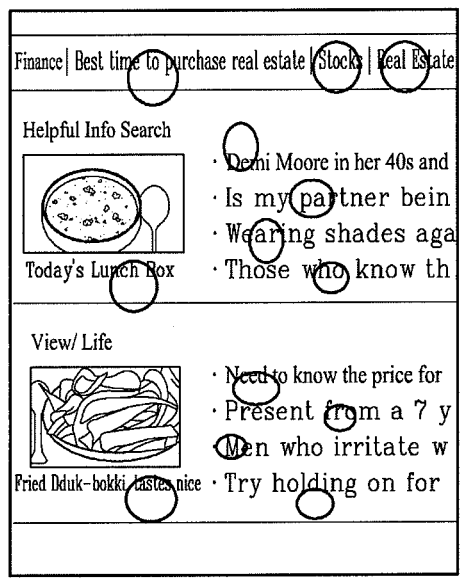

In FIG. 9, it is assumed that the condition for deciding the optimal display magnification is the range of the number of links (e.g., 10 to 15 links) being displayed on one screen.

First of all, referring to (a) of FIG. 9, a web page area is displayed depending upon the default settings, or a web page area adjusted by the optimal magnification is displayed.

At this point, as the user changes the displayed web page area by manipulating a navigation key or by inputting a predetermined touch pattern, an area of the corresponding web page, such as (b) of FIG. 9, may be displayed. The area displayed in FIG. 9 cannot satisfy the condition for deciding the optimal display magnification by including only 2 links.

Therefore, a change in the optimal display magnification according to the embodiment of the present invention is performed. And, as a result, the display magnification is decreased so that the condition for deciding the optimal display magnification can be satisfied, as shown in (c) of FIG. 9, thereby displaying an adequate number of links.

Yet Another Aspect of the First Embodiment

According to yet another aspect of the first embodiment of the present invention, when the user inputs a command for changing the displayed web page area, a method of deciding in advance the magnification and position of a web page, which exists along the direction of the corresponding change command, and displaying the decided magnification and position is provided.

For example, when a scroll command is inputted along a specific direction in order to change the web page area that is being displayed, settings may be made so that the scrolling range can be automatically decided to best-fit (or satisfy) the conditions for deciding the optimal magnification/position of the web page, which exists along the scrolling direction. More specifically, before displaying the web page that exists along a direction corresponding to the scroll command, the magnification and position that are to be displayed are decided in advance, thereby enabling the current screen to be immediately switched (or changed) to a screen best-fitting (or satisfying) the conditions for deciding the optimal magnification/position of the web page and existing along the scrolling direction. Most particularly, for example, in case the condition for deciding the optimal magnification/position corresponds to including 3 links in a single screen, a web page area displaying all of the 3 links that exist along the scrolling direction at once may be immediately displayed.

This will be described in detail with reference to FIG. 10.

Figure 10:
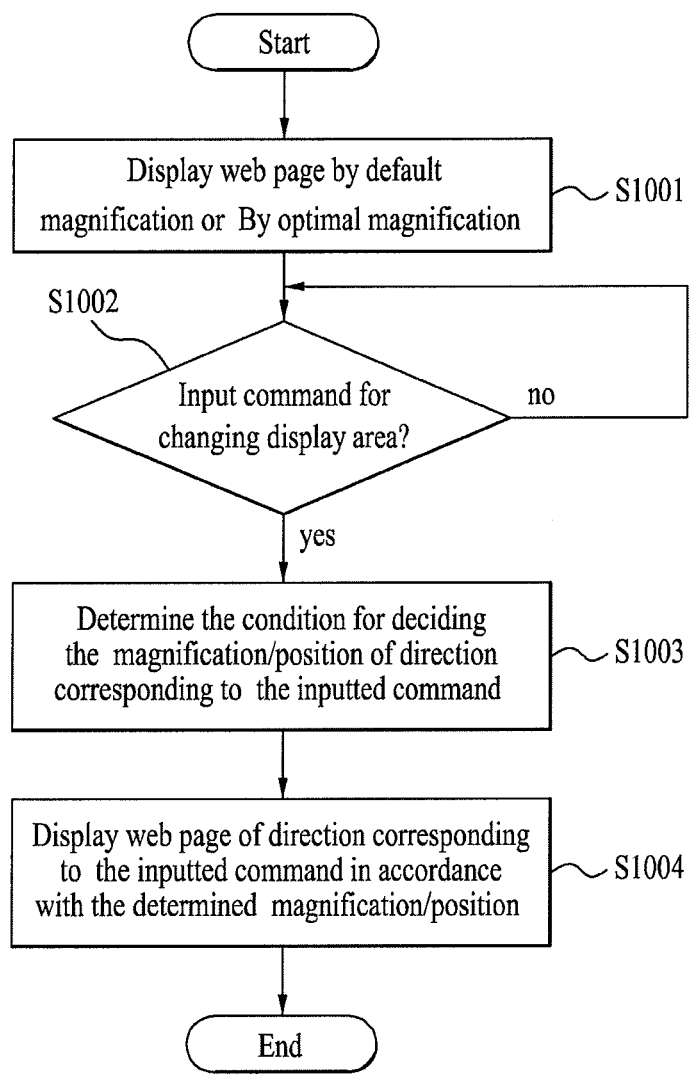
FIG. 10 illustrates an exemplary procedure for deciding an optimal magnification and display position according to another aspect of the embodiment of the present invention.

FIG. 10 illustrates an exemplary procedure for deciding an optimal magnification and display position according to another aspect of the embodiment of the present invention.

First of all since step S1001 of FIG. 10 is similar to step S801 of FIG. 8, detailed description on the identical features of this process step will be omitted for simplicity.

Thereafter, a command for changing the display area is inputted by the user (S1002).

An example of such command includes an input of a navigation key corresponding to a specific direction or an input of a touch pattern corresponding to a scroll command respective to a specific direction.

When the command for changing the display area is inputted, the controller 180 determines information for deciding the optimal magnification of a web page, which exists in the direction corresponding to the inputted command, and determines a magnification and position satisfying the predetermined condition for deciding the optimal magnification/position (S1003).

More specifically, among the web page areas existing along the direction corresponding to the inputted command, the controller 180 is able to determine the web page area best-fitting the condition for deciding the optimal magnification/position.

Subsequently, in accordance with the determined magnification and position, the web page that exists along the direction corresponding to the inputted command is displayed (S1004).

Meanwhile, if the position/magnification has already been automatically adjusted prior to the change in the display area, the previously adjusted magnification can be maintained regardless of the scrolling when the display area is changed once again in a later process. Alternatively, each time the screen is scrolled, the magnification may be newly adjusted in accordance with the predetermined display conditions, such as links/images/strings, that are to be included in the next displayed screen.

Hereinafter, a detailed format of a command for changing the display area (or display area change command) will be described with reference to FIG. 11.

Figure 11:
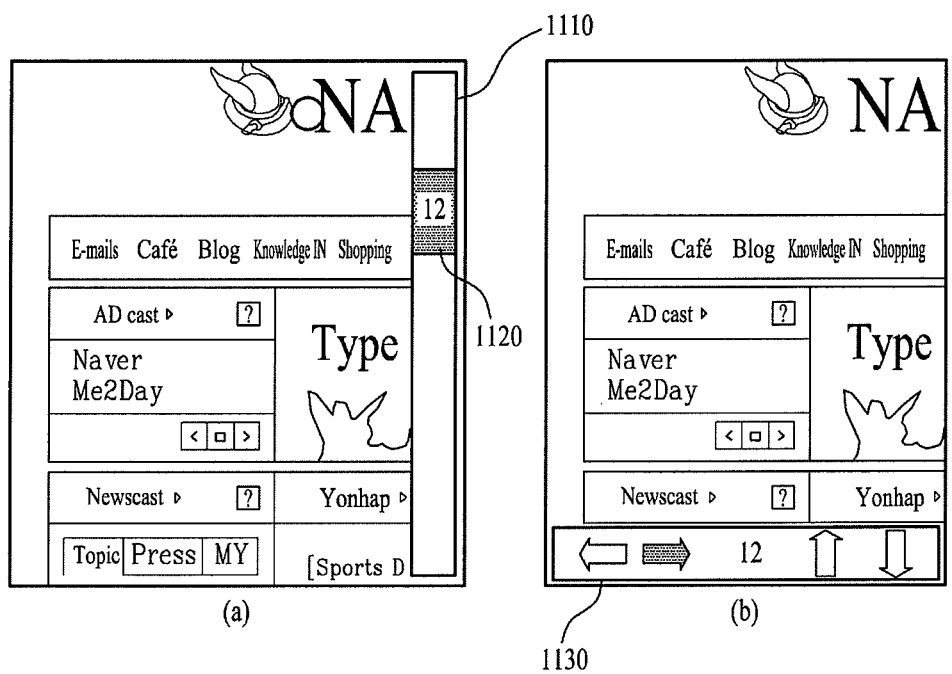
FIG. 11 illustrates an exemplary method for inputting a command for changing the display area of a web page according to yet another aspect of the embodiment of the present invention.
Figure 11:
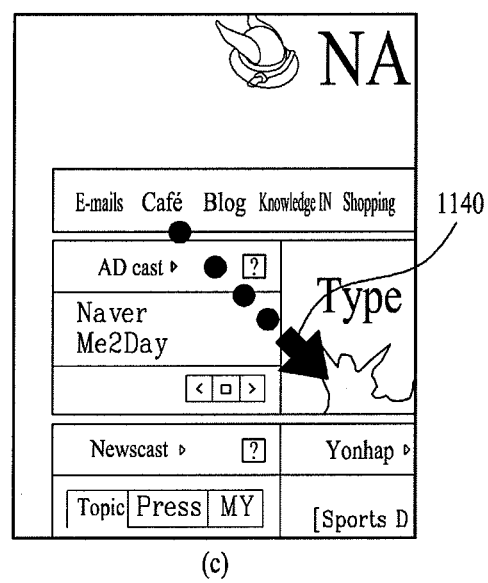

FIG. 11 illustrates an exemplary method for inputting a command for changing the display area of a web page according to yet another aspect of the embodiment of the present invention.

In order to receive a command for changing the display area from the user, a scroll bar area 1110 is displayed in an area of the display unit 151, as shown in (a) of FIG. 11. At this point, the conditions for deciding the optimal magnification/position can be displayed on a scroll bar 1120. In this case, as the user slides the scroll bar upwards or downwards, the web page area satisfying (or best-fitting) the condition for deciding the optimal magnification/position can be displayed.

Additionally, a navigation key area 1130 is displayed as shown in (b) of FIG. 11. The condition for deciding the optimal magnification/position is also displayed in the navigation key area.

Instead of displaying a separate scroll bar area or a navigation key area, the displayed web page area may also be changed by inputting a dragging motion or a flicking touch for scrolling the display screen, as shown in (c) of FIG. 11.

Meanwhile, unlike in the condition for deciding the optimal magnification/position according to the first embodiment and the second embodiment of the present invention, the condition for deciding the optimal magnification/position according to this aspect of the present invention is more focused on the position of the display screen. An example of the respective method for displaying the display position will be described in detail with reference to FIG. 12.

Figure 12:
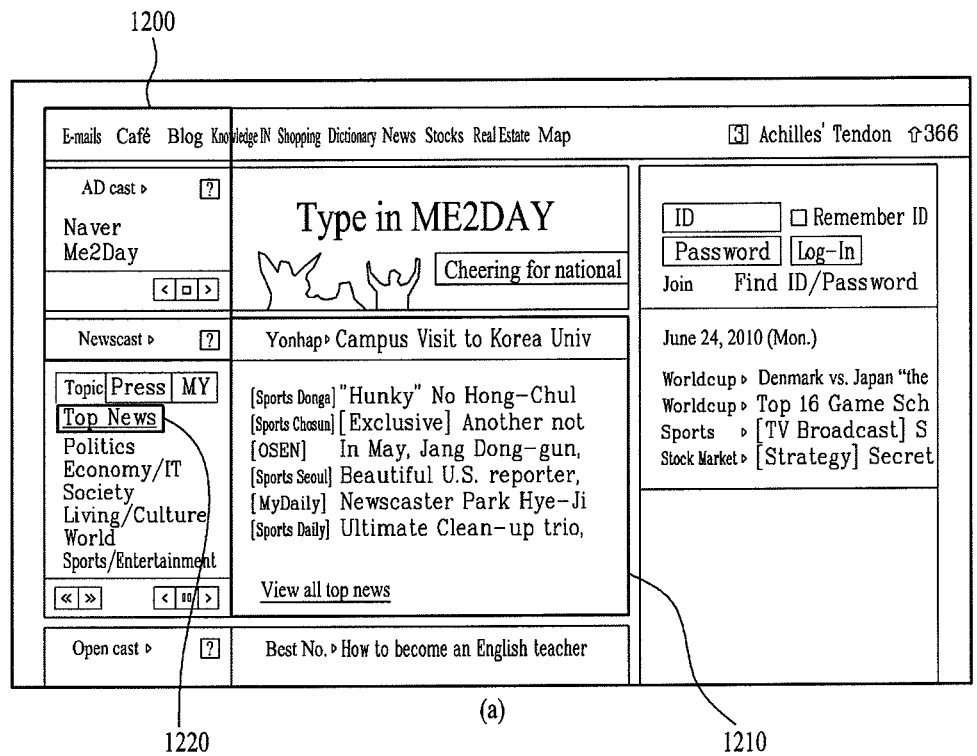
FIG. 12 illustrates an exemplary procedure for deciding a display area according to yet another aspect of the embodiment of the present invention.
Figure 12:
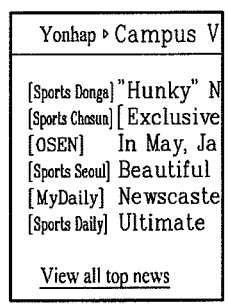
Figure 12:
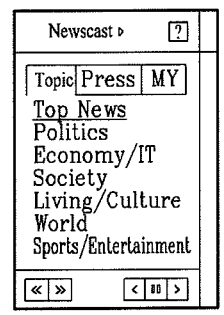

FIG. 12 illustrates an exemplary procedure for deciding a display position according to yet another aspect of the embodiment of the present invention.

In deciding the optimal display position according to the embodiment of the present invention, the presence or absence of a table, the inclusion/included position of a predetermined string, the presence or absence of a web page specific predetermined area (e.g., offset), and, in case of a trigger respective to a page scroll, the presence or absence of the above-described conditions (including the condition for deciding the magnification) that exist in the scrolling direction (i.e., in the next area that is to be displayed) may be taken into consideration.

In a web page, as shown in (a) of FIG. 12, an upper left area 1200 is initially displayed in accordance with default magnification settings of the corresponding web browser.

At this point, if a web page specific area 1210 is predetermined, and when a command for changing the display area is inputted by the user, an optimal display magnification can be decided within the specific area 1210, as shown in (b) of FIG. 12.

Alternatively, if a higher priority level for deciding the display position is assigned to the string "Top News", and when a command for changing the display area is inputted by the user, an optimal display magnification can be decided in a table including the corresponding string, as shown in (c) of FIG. 12.

Figure 13:
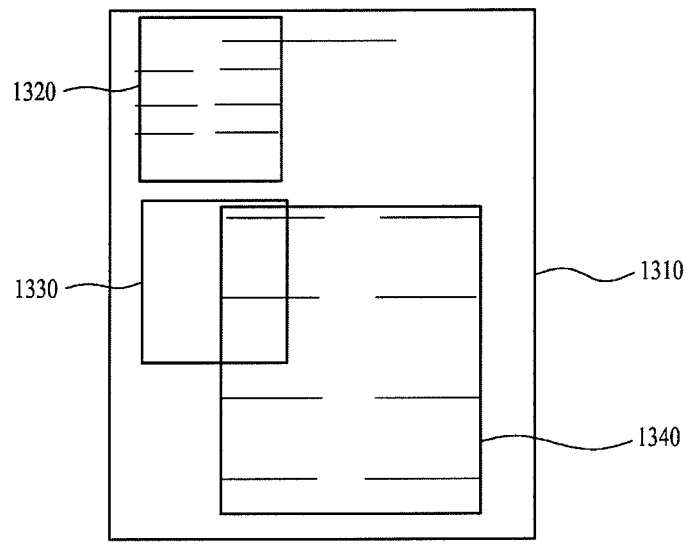
FIG. 13 illustrates an exemplary detailed format of a display magnification and display area according to yet another aspect of the embodiment of the present invention.
Figure 13:
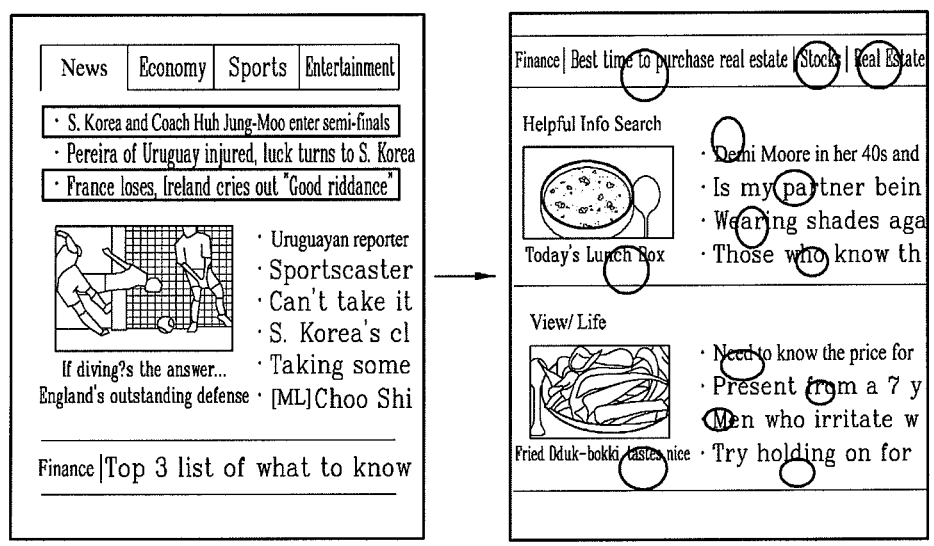

FIG. 13 illustrates an exemplary detailed format of a display magnification and display position according to yet another aspect of the embodiment of the present invention.

In FIG. 13, it is assumed that the number of links is determined as the condition for deciding the optimal magnification/position.

Item (a) of FIG. 13 illustrates the assigned positions of each link included in a random web page 1310 in the form of solid lines.

Herein, it is assumed that the area being initially displayed with respect to the initial settings of the web browser, or with respect to the application of the optimal display magnification of an initial display area according to an embodiment of the present invention, corresponds to area 1320.

At this point, when the user inputs a command for scrolling the screen in a downward direction (or downwards), and when the web page area having its optimal magnification/position adjusted according to the embodiment of the present invention is not displayed, then area 1330 is displayed.

However, when the web page area having its optimal magnification/position adjusted according to the embodiment of the present invention is displayed, with respect to the user's input of the command for scrolling the screen downwards, area 1340 may be immediately displayed. Eventually, instead of performing all of the process steps shown in (a) to (c) of FIG. 9, by simply inputting a command for scrolling the display screen in a particular direction, as shown in (b) of FIG. 13, the web page area corresponding (c) of FIG. 9 may be immediately displayed from the web page area corresponding to (a) of FIG. 9.

Meanwhile, in the other aspect of the embodiment of the present invention, when a link/image/string portion is not entirely displayed in the web page area, which is currently being displayed, and when the user performs a manipulation associated to scrolling (such as manipulating the navigation key, performing dragging or flicking gestures) in a direction where a non-displayed link/image/string portion exists, a sufficient degree of scrolling can be performed so that the non-displayed portion can be entirely displayed on the screen.

Additionally, in the above-described embodiments of the present invention, the optimal magnification/position display may be triggered even when the display screen moves to a new page through a link, or when the display screen moves to a new page and then return to the previous page.

Furthermore, in the above-described embodiments of the present invention, even if the entire link/image/string is not displayed on a screen having its magnification/position adjusted, either the link/image/string may be displayed partially as long as the above-described condition for deciding the optimal magnification/position is satisfied, or the magnification/position may be additionally adjusted so that the entire link/image/string can be displayed on the screen. It is preferable to predetermine the limit of the enlarged/reduced magnification, and, a plurality of limit values may be considered and prepared on a web page basis, an area basis, or based upon various conditions, such as a presence/absence of a table.

Second Embodiment

Another embodiment of the present invention proposes a method for actively assigning an access key to a link and displaying the assign access key, regardless of the presence or absence of the respective access key, which has been assigned through an HTML tag. In order to do so, detailed description is required to be made on a web browsing environment and an access key.

1) Access Key

Recently, with an outstanding improvement in the performance of a processor of the mobile terminal, i.e., a controller 180 of the mobile terminal, the processor (i.e., controller 180) have become capable of performing highly advanced operations (or calculations). Also, with the enhancement in the performance of a wireless communication unit 110 high speed data communication has become available through diverse wireless interfaces. Accordingly, the quality of web surfing (i.e., web browsing) in a desktop computer environment has become equally available in mobile terminals. A web page that is being displayed through a web browser generally includes one or more links (or hyperlinks). A link indicates a specific web page by using address values of the corresponding web page. And, when the user selects a link, shifting (or moving) to a web page directed by the selected link may occur. In the related art mobile telecommunication environment, there were limitations in the size of the display unit. Therefore, users experienced a variety of inconvenience, such as degraded readability of a specific link depending upon the enlarged magnification of the display unit or difficulty in being ensured with touch accuracy. Generally, in order to facilitate such link selection, an access key is assigned to a link included in the corresponding web page through a specific tag of a web programming language. Herein, an access key refers to a specific key button of a user input unit corresponding to a specific link, in order to simplify the link selection performed by the user. Accordingly, in the method of using an access key, when the user manipulates the specific key button, a link corresponding to the manipulated key button is selected. Herein, a web programming language is a collective concept including hypertext markup language (HTML), JAVA, XML, CSS, ASP, and so on. However, in the description of the present invention, it is assumed that HTML is used as the web programming language for simplicity. In other words, the corresponding document is assumed to be an HTML document.

The formats of a general access key and an HTML tag will be described in detail with reference to FIG. 14.

Figure 14:
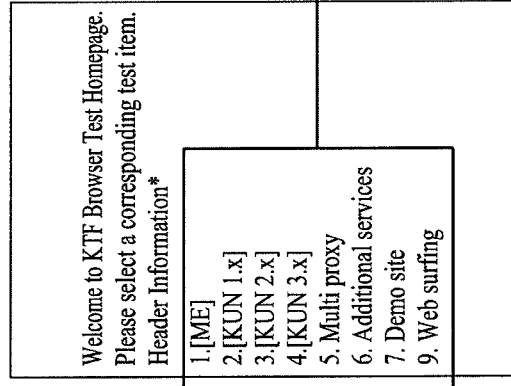
FIG. 14 illustrates a display of general access keys and exemplary web programming languages for each access key.

FIG. 14 illustrates an exemplary display of a general access key and an exemplary web programming language coding for each access key.

In the following drawings including FIG. 14, a link is shown to be configured as a text type. However, this is merely exemplary and, therefore, the present invention will not be limited only to the example presented herein. In other words, diverse formats including a flash object can be applied to a link.

First of all, referring to (a) of FIG. 14, a web page is displayed on the display unit of the mobile terminal. Herein, a total of 8 links, i.e., link #1 to link #7 and link 9, exist in this web page. At this point, an "accesskey=" tag is used, as shown in (b) of FIG. 14, thereby enabling an access key corresponding to each number key of the user input unit to be assigned for each link. For example, as shown in (a) of FIG. 14, the user can select a "1[ME]" link by manipulating the cursor or by using a method of applying a touch input to the corresponding link. Moreover, the user can also select the "1[ME]" link by using a method of manipulating key button "1" of the user input unit 130.

However, the above-described general assignment of the access key is only valid in the corresponding web page. Accordingly, the user cannot arbitrarily change (or alter) the setup values predetermined by the web page provider. This will be described in detail with reference to FIG. 15.

Figure 15:
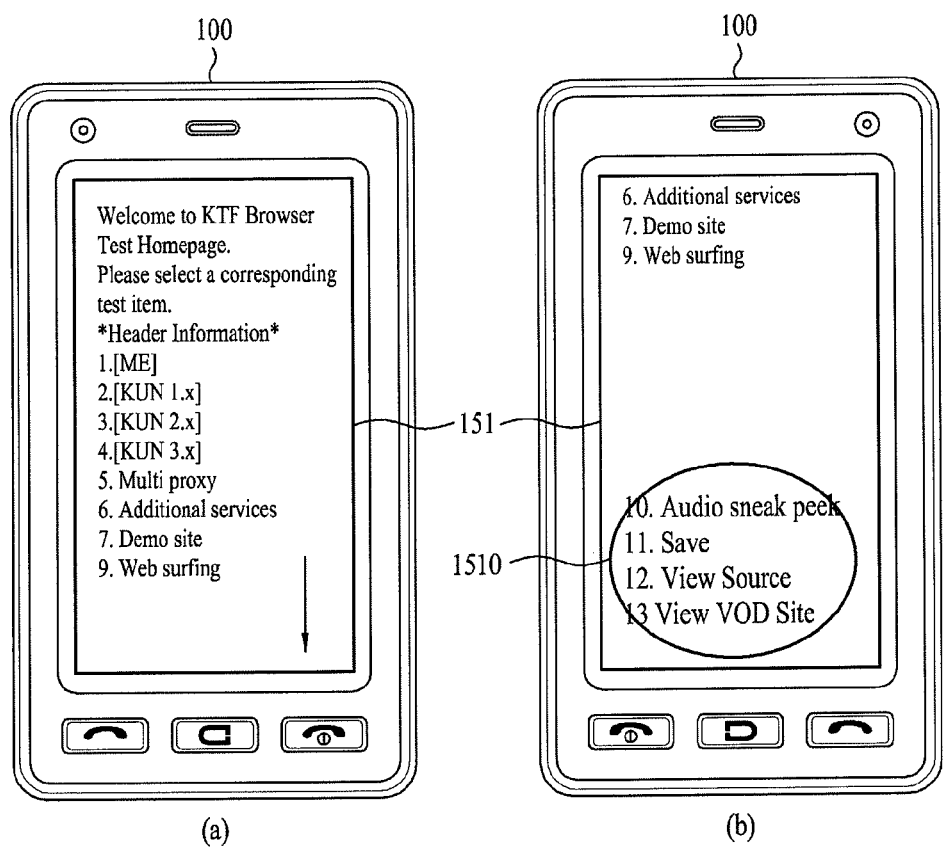
FIG. 15 illustrates problems of the conventional access keys.

FIG. 15 illustrates problems of the conventional access keys.

Referring to (a) of FIG. 15, when a web browser is executed so as to display a web page, which is identical to that of (a) of FIG. 14, on the display unit 151, the user inputs a predetermined command through the user input unit 130, so as to scroll the web page in a downward direction (or downwards).

As a result, although an area including link #10 to link #13 1510 is displayed on the display unit 151 below the already-existing link #9, if access keys are not assigned to the new links 1510 by using HTML tags, the new links 1510 cannot be selected by the access keys. Moreover, even though the already-existing links having respective access keys assigned thereto are not shown on the display screen, the corresponding access keys are not retrieved. Furthermore, in the conventional method, since access keys are not set-up (or determined) by the user or the mobile terminal and are predetermined by web page specific settings, it is impossible for the user or mobile terminal to arbitrarily change (or alter) the correspondence between a hot key and a link. Hereinafter, in the following description of the present invention, the term "access key" may also be referred to as a "Hot Key".

Therefore, the embodiment of the present invention proposes a method for actively assigning an access key to a link and displaying the assigned access key, regardless of the presence or absence of an access key assigned through an HTML tag. The procedure for this method will be described in detail with reference to FIG. 16.

Figure 16:
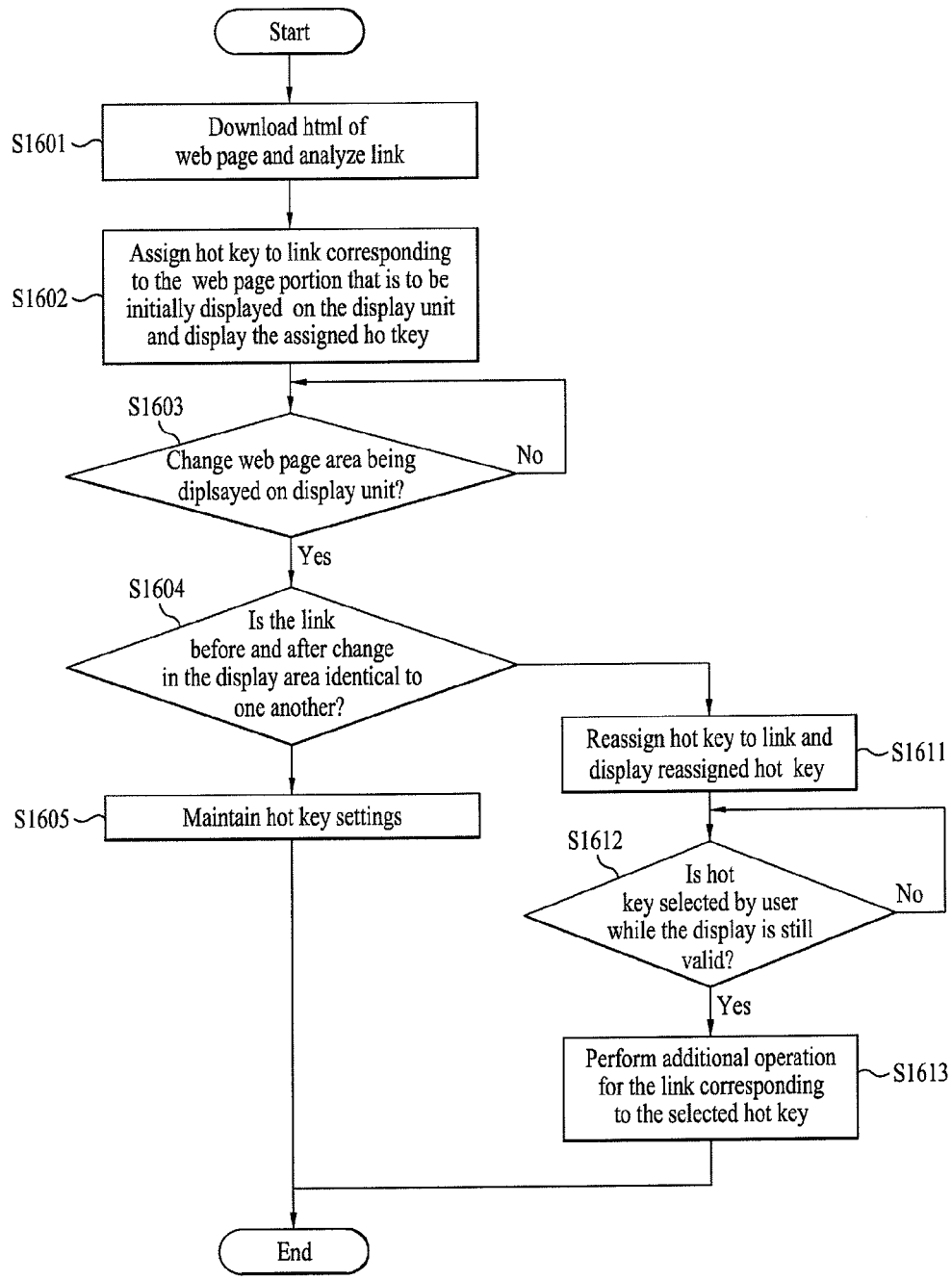
FIG. 16 illustrates a flow chart showing an exemplary procedure for assigning and applying access keys to a mobile terminal according to another embodiment of the present invention.

FIG. 16 illustrates a flow chart showing an exemplary procedure for assigning and applying access keys to a mobile terminal according to another embodiment of the present invention.

Referring to FIG. 16, when a web browser is executed, the controller 180 first controls the mobile terminal so that an HTML document of a web page can be downloaded, and then analyzes the link(s) included in the downloaded document (S1601). Herein, the web page may correspond to a web page set up by default or a web page directed through a link or selected from a "My Favorites" folder.

At this point, a procedure for analyzing a link follows the process steps described below.
  Convert the downloaded HTML document to a formatted document (i.e., convert the downloaded HTML document to a grammar-checked and corrected document or an XML document).
  Recognize each tag included in the converted document.
  Perform parsing in a tree structure based upon the recognized tags.
  Read the tree information from top to bottom so as to understand and sort the information carried by each tag.
  Analyze hyperlink tags included in the document.

When the link analysis is completed by using the above-described procedure, the controller 180 uses the analysis result so as to determine the area of the corresponding web page that is to be initially displayed on the display unit 151, assign a hot key to a link included in the corresponding area, and displaying the assigned result on the display unit through a predetermined visual effect applied to the initially displayed area of the web page (S1602).

At this point, the area that is initially displayed on the display unit is modified by an input of scroll/enlarge/reduce commands of the user through the user input unit (S1603).

In this case, the controller 180 determines whether or not the link included in the modified display area is identical to the link included in the initial display area (S1604).

If there is no change in the link, the settings for the hot key may be maintained as assigned in step S1602 (S1605).

Conversely, if there is a change in the link, the controller reassigns a new hot key with respect to the changed link, thereby displaying the newly assigned hot key on the display unit (S1611).

If there is no change in the hot key settings, or while the visual effect applied to the changed and newly assigned hot key is still valid (or, even if the visual effect is no longer active (or valid), when there is no change in the link of the web page area being displayed on the display unit due to the scrolling/enlargement/reduction of the display area), a specific hot key is selected by a command inputted by the user through the user input unit 130 (S1612).

When the hot key is selected, operations such as moving (or jumping) to link of a web page directed (or designated) by the hot key or adding the corresponding link to "My Favorites" may be performed (S1613).

Hereinafter, each process steps of the operation procedure described with reference to FIG. 16 will be described in more detail.

2) Method for Comparing Sameness in Links Shown in Step S1604

When an HTML document is downloaded from a specific web page in step S1601, the comparison of links may be performed by applying an identifier (e.g., numbering), based upon a predetermined standard, to each link existing within the downloaded document, and by then comparing the identifier of each link included in each display area before and after the area displayed on the display unit is changed. In case an identifier is not applied, the sameness (or identity) of the links can be verified by performing a one-to-one (1:1) comparison on the address values of the web page directed by the corresponding link.

3) Method for Determining Whether or not a Link is Included in an Area Displayed on the Display Unit in Step S1604

Within an entire HTML document, whether or not a specific link is displayed in on the display unit can be determined by verifying whether or not an offset value of an area having the corresponding link positioned therein exists within the offset of the area that is being displayed on the display unit.

Herein, the problem lies in the case where only a portion of the link is displayed within the area displayed on the display unit. This will be described in more detail with reference to FIG. 17.

Figure 17:
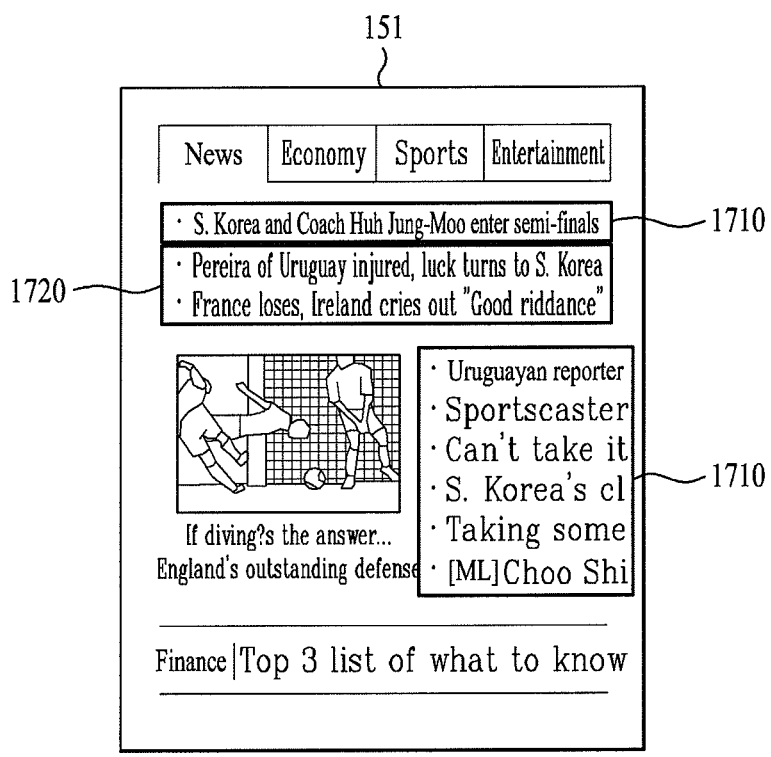
FIG. 17 illustrates a display state diagram showing an exemplary format of an entire link or a portion of a link being displayed in a predetermined area of the web page.

FIG. 17 illustrates a display state diagram showing an exemplary format of an entire link or a portion of a link being displayed in a predetermined area of the web page.

Referring to FIG. 17, a web browser is being executed, and an area of a news web page is being displayed on the display unit. Depending upon the initial display settings, or due to the scrolling/enlargement/reduction, partially displayed links 1710 and entirely (or fully) displayed links 1720 may occur (or may be shown) in the web page area, which is being displayed on the display unit. In this case, although the links that are being entirely (or fully) display are not problematic, whether or not to include the partially displayed links as the subject of comparison may be problematic.

Accordingly, the embodiment of the present invention proposes two different standards. One of the two standards corresponds to 'What is the display ratio of the corresponding link being displayed on the display unit?', and the other standard corresponds to 'Is the beginning (i.e., upper left portion) of the corresponding link displayed on the display unit?'. The application status and ratio value of the two standards may vary depending upon the settings inputted by the user, and the user settings result can be stored in a memory unit 160.

4) Standard and Order for Assigning a Hot Key in Step S1602 or step S1611

The number of hot keys that are being assigned may be less than or equal to a number of hardware key buttons that are provided in the mobile terminal. If hot keys can be identified by key buttons or different colors of a virtual keypad provided on a touch screen shown in FIG. 3, the number of hot keys may be limited by the number of key buttons or colors on the virtual keypad. Therefore, it is preferable that the maximum number of hot keys being assigned based upon such limitations is pre-decided. And, accordingly, a number of hot keys less than or equal to the number of links being displayed on the display unit may be assigned within the range of the pre-decided number of hot keys that can be assigned.

The order of assigning a hot key will now be described with reference to FIG. 18.

Figure 18:
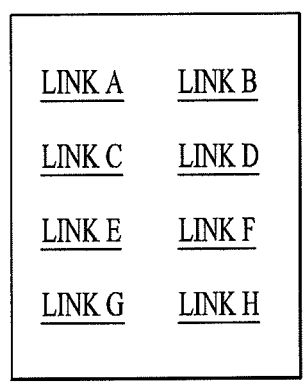
FIG. 18 illustrates an exemplary order by which a hot key is assigned to a link that is being displayed on a display unit of the mobile terminal according to another embodiment of the present invention.
Figure 18:
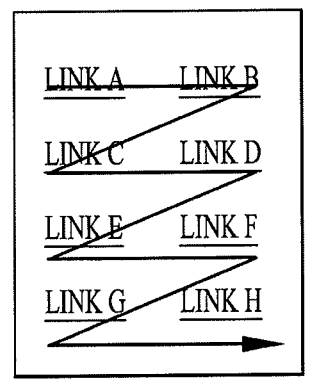
Figure 18:
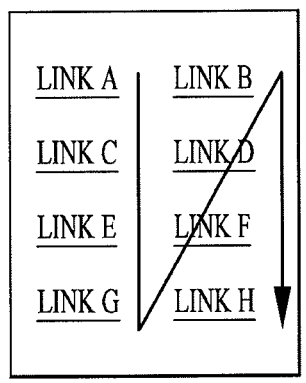
Figure 18:
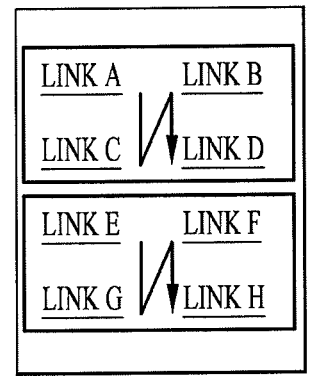

FIG. 18 illustrates an exemplary order by which a hot key is assigned to a link that is being displayed on a display unit of the mobile terminal according to another embodiment of the present invention.

First of all, as shown in (a) of FIG. 18, 8 links from Link A to Link H to at least a partial area of a specific web page is displayed on the display unit. And, it is assumed that the maximum number of hot keys set up in the corresponding mobile terminal is equal to 8 or more. Also, referring to FIG. 18, the number, format, name, and positioning of the links are merely example given to facilitate the understanding of the present invention. Therefore, the present invention will not be limited only to the examples given herein, and the present invention may also be applied to web pages having a variety of other link positioning methods.

The order of assigning a hot key to each link in a web page having a link positioning as shown in (a) of FIG. 18, can be realized in a horizontal-to-vertical (horizontal→vertical) direction, as shown in (b) of FIG. 18, i.e., in a form similar to the alphabet 'Z', or the order of assigning the hot keys can be realized in a vertical-to-horizontal (vertical→horizontal) direction, as shown in (c) of FIG. 18, i.e., in a form similar to the alphabet 'N'.

If links are included in a table, as shown in (d) of FIG. 18, the above-described N-shaped or Z-shaped order of assigning hot keys may be decided in table units (i.e., for each table).

In addition to the above-described order of assignment, among the links being displayed on the display unit, when a link has a previous record of being selected by the user, a hot key is not assigned to the corresponding link, or a category of the hot key may be varied, or the priority of the corresponding link may be decided as the highest priority level or to the lowest priority level.

If a predetermined identifier (numbering) is applied in the method for comparing the sameness of the links, as described above, hot key may be assigned by an increasing/decreasing order of identifiers.

Furthermore, if a displayed web page area is changed due to the scrolling/enlargement/reduction of the displayed screen, lower priority levels or higher priority levels can be given to the links that are displayed on the newly changed web page as compared to the already-existing links. This will be described in more detail with reference to FIG. 19.

Figure 19:
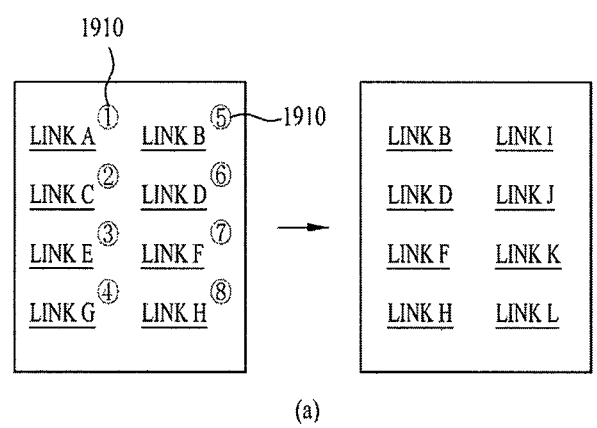
FIG. 19 illustrates an exemplary order by which a hot key is assigned with respect to a change in the link that is being displayed on a display unit of the mobile terminal according to another embodiment of the present invention.
Figure 19:
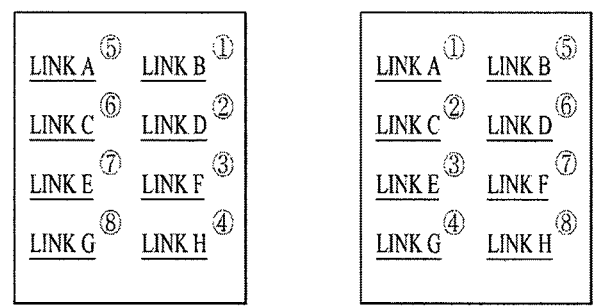

FIG. 19 illustrates an exemplary order by which a hot key is assigned with respect to a change in the link that is being displayed on a display unit of the mobile terminal according to another embodiment of the present invention.

First of all, as shown in (a) of FIG. 19, 8 links from Link A to Link H to at least a partial area of a web page is displayed on the display unit. Also, hot keys 1 to 8 are assigned in the N-shaped order, and numbers 1910 corresponding to each of the assigned hot keys are respectively marked on the upper right portion each link as the respective visual effect. In the example shown in (a) of FIG. 19, it is assumed that the user has inputted a scroll command so that Links I, J, K, and L are positioned on the respective right sides of Links B, D, F, and H.

In this case, hot keys may be assigned to the newly displayed links while maintaining the already-existing (or previously assigned) hot keys, as shown in (b) of FIG. 19. Or, hot keys may be assigned with higher priority to the newly displayed links, and then the remaining hot keys are assigned to the already-existing links.

Alternatively, regardless of the already-existing links and the newly displayed links, hot keys may be assigned in an order decided by default, as shown in (c) of FIG. 19.

Hereinafter, a method for assigning a hot key for each area will now be described with reference to FIG. 20.

Figure 20:
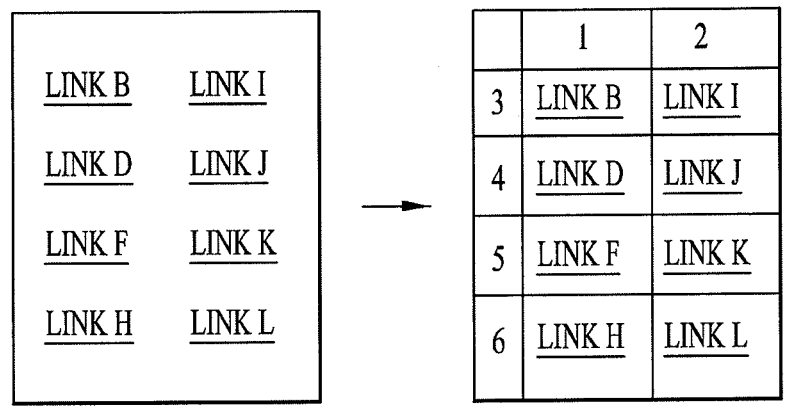
FIG. 20 illustrates an exemplary method for assigning a hot key for each area having a link positioned therein according to another embodiment of the present invention.
Figure 20:
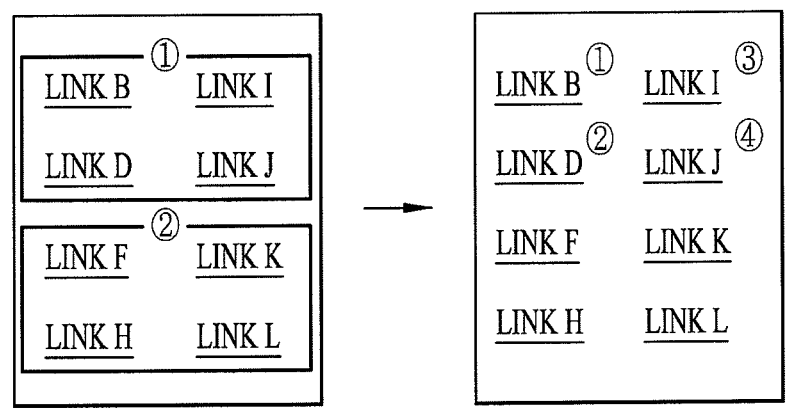

FIG. 20 illustrates an exemplary method for assigning a hot key for each area having a link positioned therein according to another embodiment of the present invention.

First of all, referring to (a) of FIG. 20, coordinates are assigned while considering the positions of each link. For example, in order to select Link J, the user can manipulate hot key 2 and hot key 4 either simultaneously or sequentially.

Alternatively, groups can be defined for a predetermined surface area, number of links, or table, as shown in (b) of FIG. 20. And, when a group hot key is selected, hot keys are then respectively assigned to the links, which are included in each group, by the order of any one of the above-described methods.

5) Displaying the Hot Keys Assigned in Step S1602 or Step S1611

In order to display the hot keys, which are assigned based upon the above-described standards, on the display unit, the present invention proposes a method of applying an on-screen display (OSD) or an overlay display method using Alpha blending (i.e., a semi-transparent effect) without changing the link positioning of the HTML document.

The display of the assigned hot keys, i.e., the visual effects applied to the links can be displayed near the respective link in the form of symbols/numbers/icons/colors corresponding to the buttons (or colors) each having a hot key assigned thereto. The position of each visual effect may be located at the starting point, the mid-point, or the end point of each link. However, in case the link cannot be fully displayed on the display screen, each visual effect may be positioned at the point where the corresponding link starts showing on the display screen. This will be described in detail with reference to FIG. 21.

Figure 21:
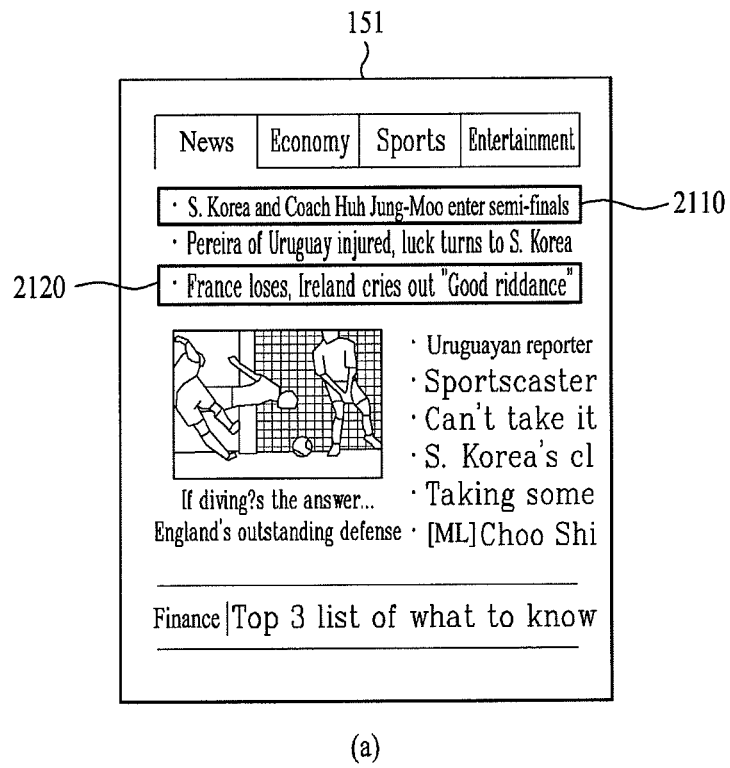
FIG. 21 illustrates an exemplary format of assigned hot keys being displayed according to another embodiment of the present invention.
Figure 21:
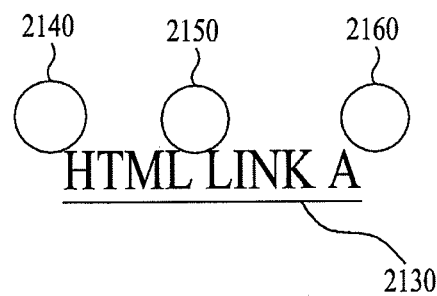

FIG. 21 illustrates an exemplary format of assigned hot keys being displayed according to another embodiment of the present invention.

First of all, referring to (a) of FIG. 21, depending upon the screen magnification or scroll status, a partially displayed link 2110 may exist, and a fully displayed link 2120 may also exist in the web page.

At this point, the visual effect indicating the hot key assigned to a link 2130 may be marked on the starting point 2140, mid-point 2150, and end point 2160 of the corresponding link, as shown in (b) of FIG. 21. Herein, as shown in (a) of FIG. 21, the link 2130 is not problematic when the link 2130 corresponds to the fully displayed link 2120. However, in case the link 2130 corresponds to the partially displayed link 2110, the link 2130 shown in (b) of FIG. 21 may only correspond to the portion displayed on the screen.

Meanwhile, the assigned hot keys may be differentiated by different colors, thereby being displayed. This will be described in detail with reference to FIG. 22.

Figure 22:
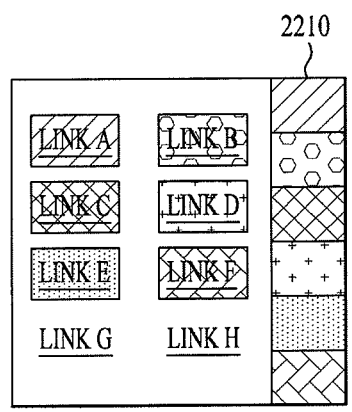
FIG. 22 illustrates an exemplary format of assigned hot keys being displayed in different colors according to another embodiment of the present invention.
Figure 22:
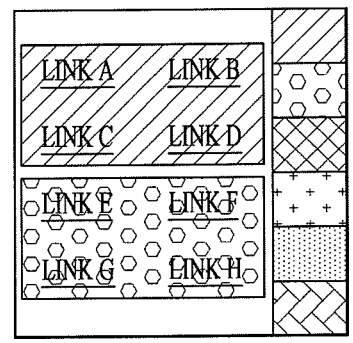
Figure 22:
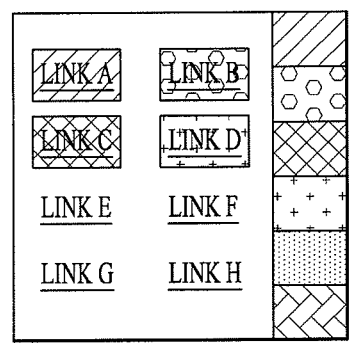
Figure 22:
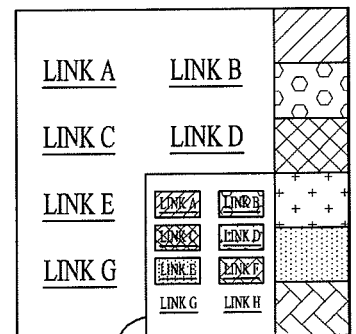

FIG. 22 illustrates an exemplary format of assigned hot keys being displayed in different colors according to another embodiment of the present invention. In FIG. 22, it is assumed that the display unit 151 is a touch screen.

First of all, in case of respectively assigning hot keys to 6 links from Link A to Link F, as shown in (a) of FIG. 22, different colors are applied to each link, and a selection area 2210 including the colors applied to each link may be displayed on one side of the display unit. As a method of selecting one of the colors shown in the selection area, the user may select the link corresponding to the selected color.

A group hot key may also be used in the method of displaying assigned hot keys using different colors. As shown in (b) of FIG. 22, a group hot key is assigned for each set of 4 links, and when a group is selected by one of the group hot keys, hot keys that are assigned by using different colors may be marked (or indicated) for each of the links included in the selected group, as shown in (c) of FIG. 22. More specifically, the division of a group is first displayed in different colors. Then, when a group is selected, colors are newly assigned to each link included in the selected group.

The number of links, positioning formation of links, color positioning of links, group formation, marking the contour of the links in colors, the shape (or format) of the selection area shown in FIG. 22 are merely exemplary. And, therefore, the present invention will not be limited only to the example given herein, and the present invention may be applied to diverse forms of link positioning and color displaying methods.

Meanwhile, when a plurality of links is adjacent to one another, it is preferable that the hot keys respective to each link are positioned without overlapping one another.

As described above, the visual effects applied to the hot keys assigned to each link may always be displayed, or the visual effect may be displayed only when a predetermined triggering condition is satisfied. Examples of such triggering condition may include a case when specific key buttons (hardware key buttons provided in the main body of a mobile terminal and/or virtual key buttons on a touch screen) are manipulated, a case when shaking movements of a specific pattern are detected by a detector 140, which detects shaking or oscillation of the mobile terminal, a case when the scrolling of a web page is completed, a case when a web browser is executed for the first time, and so on. After a predetermined elapse of time since the triggering, the display of the hot keys may disappear, and when the triggering conditions are satisfied once again, the hot keys may reappear for a predetermined period of time.

6) Performing Additional Operations Respective to Hot Key Selection

As described above, the selection of a link by using hot keys may be performed by selecting a key button (or color) corresponding to a hot key (or color) from a virtual/hardware keypad. In addition to the key button selection, a corresponding link may also be selected by touching a visual effect indicating the respective hot key.

Generally, when a hot key is selected, a web page directed by the link corresponding to the selected hot key is displayed. However, according to the embodiment of the present invention, additional functions such as adding to "My Favorites" may also be performed. This will be described in detail with reference to FIG. 23.

Figure 23:
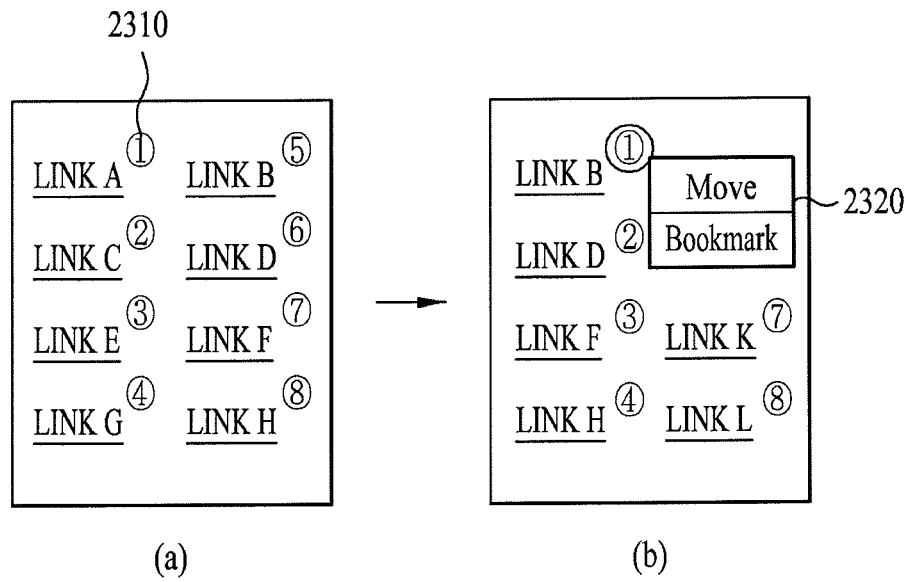
FIG. 23 illustrates an example of additional operations being performed with respect to a selected hot key according to another embodiment of the present invention.
Figure 23:
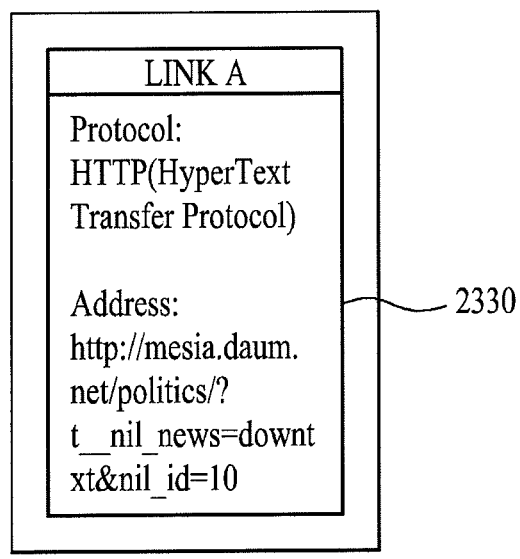

FIG. 23 illustrates an example of additional operations being performed with respect to a selected hot key according to another embodiment of the present invention.

First of all, it is assumed that hot keys 1 to 8 are assigned to 8 links, as shown in (a) of FIG. 23. At this point, in case a hot key (i.e., "1") assigned to Link A is selected, a menu window 2320 may be displayed. Herein, the menu window 2320 includes additional functions that can be executed in accordance with a link selection through a respective hot key, as shown in (b) of FIG. 23. Accordingly, the user may select a wanted additional function from the menu window 2320. In addition to a method of displaying a menu window, a function of moving (or shifting or jumping) to a web page, which is connected to a corresponding link, in accordance with a touch pattern (long/short/double touch) that is applied to a key button corresponding to a selected hot key as well as other functions such as adding to "Bookmark" may also be performed.

Meanwhile, when a link is selected by using the hot key, an operation respective to the selected link is performed (e.g., when moving to a connected web page, loading of the respective web page is initiated). Then, as shown in (c) of FIG. 23, additional/detailed information on the selected link or an enlarged image of the link may be displayed in the form of an OSD, pop-up window, or in a semi-transparent format for a predetermined period of time.

Furthermore, according to the embodiment of the present invention, the above-described method may be realized in a medium having a program recorded therein by using a code that can be read by a processor. Exemplary media that can be read by the processor may include ROMs, RAMs, CD-ROMs, magnetic tapes, floppy disks, optical data storage devices, and so on.

The above-described mobile terminal will not be applied with limitations to the configuration and method according to the above-described embodiments of the present invention. Instead, with diverse modifications of the embodiments of the present invention, the present invention can be configured by selectively combining the entire embodiments of the present invention or partial features of the present invention.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal having a processor, comprising:
a wireless internet module performed by the processor to wirelessly transmit and receive data to and from an external device, wherein the wireless internet module performs based on WLAN, Wi-Fi, Wibro, Wimax, or HSDPA;
a display unit configured to display a specific web page received from the wireless internet module by default magnification, wherein the display unit is comprised of a liquid crystal display (LCD) or an organic light-emitting diode display (OLED);
a touch sensor configured to receive an user's touch input for changing a display area of the specific web page; and
a controller configured to:
  determine an optimized magnification level for the changed display area based on information included in the specific web page;
  display a changed display area by the optimized magnification level,
  wherein the optimized magnification level is changeable depending on a location of the received user's touch input for changing the display area of the specific web page from the touch sensor; and
  analyze an HTML document corresponding to the specific web page in order to acquire information required for deciding the optimized magnification level, wherein the optimized magnification level changes depending on a number of images near to the location of the received user's touch input, further the number of images is determined based on the analyzed HTML document.

2. A method for processing data in a mobile terminal, the method comprising:

displaying, in a display unit, a specific web page received from an external device by default magnification, wherein the display unit is comprised of a liquid crystal display (LCD) or an organic light-emitting diode display (OLED);
receiving, in a touch sensor, a user's touch input for changing a display area of the specific web page;
determining, in a controller, an optimized magnification level for the changed display area based on information included in the specific web page;
displaying, in the display unit, a changed display area by the optimized magnification level,
wherein the magnification level is changeable depending on a location of the received user's touch input for changing the display area of the specific web page from the touch sensor; and
analyzing an HTML document corresponding to the specific web page in order to acquire information required for deciding the optimized magnification level, wherein the optimized magnification level changes depending on a number of images near to the location of the received user's touch input, further the number of images is determined based on the analyzed HTML document.

* * * * *